United States Patent
Sawa et al.

(10) Patent No.: US 12,469,878 B2
(45) Date of Patent: Nov. 11, 2025

(54) NONAQUEOUS ELECTROLYTE SOLUTION AND ENERGY DEVICE

(71) Applicants: Mitsubishi Chemical Corporation, Tokyo (JP); MU Ionic Solutions Corporation, Tokyo (JP)

(72) Inventors: Shuhei Sawa, Tokyo (JP); Koichi Nishio, Tokyo (JP); Takeshi Nakamura, Tokyo (JP); Kaho Tamai, Tokyo (JP)

(73) Assignees: Mitsubishi Chemical Corporation, Tokyo (JP); MU Ionic Solutions Corporation, Tokyo (JP)

( * ) Notice: Subject to any disclaimer, the term of this patent is extended or adjusted under 35 U.S.C. 154(b) by 931 days.

(21) Appl. No.: 17/584,697

(22) Filed: Jan. 26, 2022

(65) Prior Publication Data
US 2022/0149435 A1    May 12, 2022

Related U.S. Application Data

(63) Continuation of application No. PCT/JP2020/029256, filed on Jul. 30, 2020.

(30) Foreign Application Priority Data

Jul. 31, 2019  (JP) ................. 2019-141464

(51) Int. Cl.
| | |
|---|---|
| H01M 10/0567 | (2010.01) |
| C07F 7/08 | (2006.01) |
| H01G 11/50 | (2013.01) |
| H01G 11/64 | (2013.01) |
| H01M 4/02 | (2006.01) |
| H01M 4/525 | (2010.01) |
| H01M 10/0525 | (2010.01) |

(52) U.S. Cl.
CPC ......... *H01M 10/0567* (2013.01); *C07F 7/081* (2013.01); *H01G 11/50* (2013.01); *H01G 11/64* (2013.01); *H01M 4/525* (2013.01); *H01M 10/0525* (2013.01); *H01M 2004/028* (2013.01); *H01M 2300/0025* (2013.01)

(58) Field of Classification Search
CPC ......... H01M 10/0567; H01M 10/0525; H01M 10/4235; H01M 10/052; H01M 4/525; H01M 2004/028; H01M 2300/0025
See application file for complete search history.

(56) References Cited

U.S. PATENT DOCUMENTS

2005/0118512 A1  6/2005  Onuki et al.
2013/0236777 A1  9/2013  Taki et al.
2013/0309564 A1  11/2013  Yoshida et al.
2014/0203220 A1  7/2014  Gigler et al.
2017/0222264 A1  8/2017  Morinaka et al.
2020/0220222 A1  7/2020  Watarai et al.

FOREIGN PATENT DOCUMENTS

| | | |
|---|---|---|
| CN | 103608962 A | 2/2014 |
| CN | 103943818 A | 7/2014 |
| CN | 107112589 A | 8/2017 |
| CN | 109346771 A | 2/2019 |
| EP | 2642580 A1 | 9/2013 |
| EP | 3166170 A1 | 5/2017 |
| JP | 2001-307772 A | 11/2001 |
| JP | 2004-134232 A | 4/2004 |
| JP | 2011-077029 A | 4/2011 |
| JP | 2014-137993 A | 7/2014 |
| JP | 2016-035820 A | 3/2016 |
| JP | 2016-098189 A | 5/2016 |
| JP | 2017-191634 A | 10/2017 |

(Continued)

OTHER PUBLICATIONS

Extended European Search Report issued in corresponding European Application No. 20846452.9 dated Oct. 21, 2022.

(Continued)

*Primary Examiner* — Adam A Arciero
(74) *Attorney, Agent, or Firm* — Morgan, Lewis & Bockius LLP

(57) ABSTRACT

Provided is a nonaqueous electrolyte solution which can provide an energy device in which the initial discharge resistance is reduced and the gas generation during storage is inhibited. This nonaqueous electrolyte solution for an energy device including a positive electrode and a negative electrode is characterized by containing a compound represented by the following Formula (1) together with an electrolyte and a nonaqueous solvent:

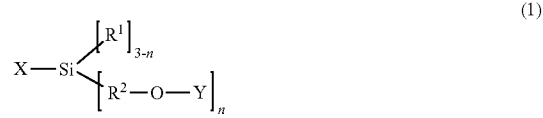

(1)

(wherein, X represents an optionally substituted unsaturated hydrocarbon group and at least one unsaturated carbon-carbon bond; Y represents an organic group, which is constituted by atoms selected from the group consisting of a carbon atom, a hydrogen atom, an oxygen atom, a sulfur atom, and a phosphorus atom; $R^1$ represents a hydrogen atom, a halogen atom, or an unsubstituted or halogen atom-substituted hydrocarbon group; $R^2$ represents an unsubstituted or halogen atom-substituted hydrocarbon group; and n represents an integer of 1 to 3).

20 Claims, No Drawings

(56) References Cited

FOREIGN PATENT DOCUMENTS

| JP | 2019-057356 | A1 | 4/2019 |
| WO | 2016/013480 | A1 | 1/2016 |
| WO | 2017/138453 | A1 | 8/2017 |
| WO | 2019/059365 | A1 | 3/2019 |

OTHER PUBLICATIONS

Office Action and Search Report issued in corresponding Chinese Patent Application No. 202080054450.2 dated Jul. 28, 2023.
International Preliminary Report on Patentability and Written Opinion issued in related International Patent Application No. PCT/JP2020/029256 dated Feb. 1, 2022.
International Search Report issued in related International Patent Application No. PCT/JP2020/029256 dated Oct. 27, 2020.
Notice of Reasons for Refusal issued May 28, 2024 for Japanese Patent Application No. 2021-535429.

NONAQUEOUS ELECTROLYTE SOLUTION AND ENERGY DEVICE

CROSS-REFERENCE TO RELATED APPLICATION

This is a continuation of International Application PCT/JP2020/029256, filed on Jul. 30, 2020, and designated the U.S., (and claims priority from Japanese Patent Application 2019-141464 which was filed on Jul. 31, 2019) the entire contents of which are incorporated herein by reference.

TECHNICAL FIELD

The present invention relates to a nonaqueous electrolyte solution and an energy device.

BACKGROUND ART

Energy devices such as lithium primary batteries, lithium secondary batteries, electric double-layer capacitors, and lithium ion capacitors have been put into practical use in a wide range of applications including power sources for so-called consumer small hardware, for example, portable phones such as smartphones and laptop computers, as well as vehicle-mounted power sources for driving electric vehicles and the like. However, in recent years, there is an increasing demand for performance improvement in these energy devices.

Particularly, as means for improving the properties of a nonaqueous electrolyte battery, numerous studies have been conducted in the fields of the active materials of positive and negative electrodes as well as the additives of nonaqueous electrolyte solutions.

For example, Patent Document 1 discloses a study where the high-temperature cycle characteristics assuming the use at a high temperature of not lower than 60° C. as well as the high-temperature storage characteristics are improved by using an electrolyte solution for nonaqueous electrolyte battery that contains specific electrolyte salt and silane compound.

Patent Document 2 discloses a novel fluorine-containing ether compound that has a specific structure and contains a silicon atom in the molecule. It is disclosed that a nonaqueous electrolyte solution containing this fluorine-containing ether compound and a nonaqueous electrolyte battery using the nonaqueous electrolyte solution have superior cycle characteristics and the like as compared to a nonaqueous electrolyte solution containing a conventional fluorine-containing ether compound.

Patent Document 3 discloses that swelling of a negative electrode during charging and discharging, which negative electrode is capable of occluding and releasing metal ions and includes a negative electrode active material that contains a metal alloyable with Li and a graphite, can be inhibited by using a nonaqueous electrolyte solution containing a specific silicon compound.

RELATED ART DOCUMENTS

Patent Documents

[Patent Document 1] Japanese Laid-open Patent Application (Kokai) No. 2016-035820
[Patent Document 2] Japanese Laid-open Patent Application (Kokai) No. 2016-098189
[Patent Document 3] WO 2019/059365

SUMMARY OF THE INVENTION

Problems to be Solved by the Invention

In recent years, improvement in the capacities of lithium batteries has been accelerated for, for example, power sources to be mounted on electric vehicles and power sources for portable phones such as smart phones, and the ratio of voids inside these batteries has been reduced as compared to before. Accordingly, there is a further increasing demand for, particularly, a reduction in the initial discharge resistance and a reduction in the amount of gas generation during storage.

In view of the above, an object of the present invention is to provide a nonaqueous electrolyte solution which can reduce the initial discharge resistance of an energy device and inhibit the gas generation during storage of the energy device. Another object of the present invention is to provide an energy device in which the initial discharge resistance is reduced and the gas generation during storage is inhibited.

Means for Solving the Problems

The present inventors intensively studied to solve the above-described problems and consequently discovered that the initial discharge resistance can be reduced and the gas generation during storage can be inhibited by incorporating an organic group having 1 to 10 carbon atoms, which is constituted by atoms selected from the group consisting of a carbon atom, a hydrogen atom, an oxygen atom, a sulfur atom, and a phosphorus atom, into a substituent of an unsaturated hydrocarbon group-containing silane compound via an oxygen atom, thereby arriving at the present invention.

The present invention provides, for example, the following specific modes.

<1> A nonaqueous electrolyte solution comprising a compound represented by the following Formula (1) together with an electrolyte and a nonaqueous solvent:

wherein, X represents an optionally substituted unsaturated hydrocarbon group having 2 to 5 carbon atoms and at least one unsaturated carbon-carbon bond; Y represents an organic group having 1 to 10 carbon atoms, which is constituted by atoms selected from the group consisting of a carbon atom, a hydrogen atom, an oxygen atom, a sulfur atom, and a phosphorus atom; $R^1$ represents a hydrogen atom, a halogen atom, or an unsubstituted or halogen atom-substituted hydrocarbon group having 1 to 10 carbon atoms; $R^2$ represents an unsubstituted or halogen atom-substituted hydrocarbon group having 1 to 10 carbon atoms; n represents an integer of 1 to 3; if the compound includes plural $R^1$, each $R^1$ is the same or different from the other; if the compound includes plural $R^2$, each $R^2$ is the same or different from the other; and if the compound includes plural Y, each Y is the same or different from the other, with a proviso that $R^2$ and one selected from X and Y are not bound with each other to form a ring.

<2> The nonaqueous electrolyte solution according to <1>, wherein X contains a group having at least one carbon-carbon double bond.

<3> The nonaqueous electrolyte solution according to <1> or <2>, wherein X is an aliphatic unsaturated hydrocarbon group having at least one carbon-carbon double bond.

<4> The nonaqueous electrolyte solution according to any one of <1> to <3>, wherein $R^1$ is an alkyl group having 1 to 10 carbon atoms.

<5> The nonaqueous electrolyte solution according to any one of <1> to <4>, wherein $R^2$ is an alkylene group having 1 to 10 carbon atoms.

<6> The nonaqueous electrolyte solution according to any one of <1> to <5>, wherein Y is a hydrocarbon group or an alkylsulfonyl group having 1 to 10 carbon atoms, or an alkyloxycarbonyl group or an alkylcarbonyl group having 2 to 10 carbon atoms.

<7> The nonaqueous electrolyte solution according to any one of <1> to <6>, wherein the content of the compound represented by Formula (1) is 0.001% by mass to 10% by mass with respect to a total amount of the nonaqueous electrolyte solution.

<8> An energy device, including: a negative electrode; a positive electrode; and the nonaqueous electrolyte solution according to any one of <1> to <7>.

<9> The energy device according to <8>, wherein
the positive electrode contains a positive electrode active material, and
the positive electrode active material contains a lithium-transition metal composite oxide represented by the following composition formula (3):

$$Li_{a101}Ni_{b101}Co_{c101}M_{d101}O_2 \quad (3)$$

(wherein, a101, b101, c101, and d101 represent numerical values satisfying $0.90 \leq a101 \leq 1.10$, $0.40 \leq b101 \leq 0.98$, $0.01 \leq c101 < 0.50$ and $0.01 \leq d101 < 0.50$, respectively, and satisfy $b101+c101+d101=1$; and M represents at least one element selected from the group consisting of Mn, Al, Mg, Zr, Fe, Ti, and Er).

Effects of the Invention

According to the present invention, an energy device which has a reduced initial discharge resistance and exhibits excellent inhibition of the gas generation during storage can be obtained.

MODE FOR CARRYING OUT THE INVENTION

Embodiments of the present invention will now be described in detail. The below-described embodiments are merely examples (representative examples) of the present invention, and the present invention is not limited thereto. Further, modifications can be arbitrarily made to carry out the present invention, without departing from the gist of the present invention.

[1. Nonaqueous Electrolyte Solution]

Similarly to a general nonaqueous electrolyte solution, the nonaqueous electrolyte solution according to one embodiment of the present invention contains an electrolyte and a nonaqueous solvent dissolving the electrolyte, and further contains the below-described fluorine-containing compound represented by Formula (1).

Attempts have been made to improve the battery characteristics by using a fluorine-containing compound. For example, the vinylsilane moiety of trimethylvinylsilane acts on a positive electrode; however, this is a monodentate action and has a small interactive force. As for dimethylvinylsilane having a cyanoalkyl group, its cyano moiety may induce a side reaction on a positive electrode and cause an increase in the resistance. In addition, a cyano group has a poor electrochemical reduction stability and thus readily induce a reductive side reaction on the negative electrode side, which may adversely affect the battery characteristics.

For instance, when such a fluorine-substituted alkyl ether disclosed in Patent Document 1 or 2 is used, the electrons of the oxygen atom of the ether group are drawn to fluorine and the electron density of the oxygen atom is reduced, as a result of which the efficiency of coordination to a positive electrode tends to be reduced. Therefore, in an energy device that uses a conventional nonaqueous electrolyte solution containing a silicon-containing compound, the initial discharge resistance is not reduced sufficiently.

In the present invention, the mechanism in which the initial discharge resistance is reduced and inhibition of the gas generation during storage is improved in an energy device by using a nonaqueous electrolyte solution containing a compound represented by Formula (1) is not clear; however, it is presumed as follows.

The compound represented by Formula (1) according to the present invention is characterized by having "a silane moiety bound to a hydrocarbon group having an unsaturated bond" (hereinafter, may be referred to as "unsaturated silane moiety") and "an oxygen moiety bound to an organic group" (hereinafter, may be referred to as "organic group-containing oxygen moiety" or "oxygen moiety"), and it is presumed that a chelating effect to a positive electrode metal is exerted by interaction between the "unsaturated silane moiety" and the "oxygen moiety" and acts more strongly on a positive electrode. The "organic group-containing oxygen moiety" is unlikely to be electrochemically reduced, and a side reaction is thus unlikely to occur on the negative electrode side. In the case of a compound in which the "unsaturated silane moiety" and the "oxygen moiety" are directly bound with each other, hydrogen fluoride (HF) in an electrolyte solution readily causes a nucleophilic reaction to silicon, and this leads to a reduction in the stability of the compound in the electrolyte solution; however, the compound represented by Formula (1) according to the present invention contains at least one carbon atom between the "unsaturated silane moiety" and the "organic group-containing oxygen moiety" and thereby makes the nucleophilic reaction to silicon unlikely to occur structurally, and it is presumed that the stability of this compound in the electrolyte solution is improved as well.

A method of incorporating an additive (hereinafter, also referred to as "concomitant additive") such as the compound represented by Formula (1) into the nonaqueous electrolyte solution according to one embodiment of the present invention is not particularly restricted. Examples thereof include a method of directly adding the below-described compound to the electrolyte solution, and a method of generating a concomitant additive in a battery or in the electrolyte solution. As a method of generating a concomitant additive, for example, a method of generating the concomitant additive by oxidation, hydrolysis or the like of a battery constituent such as an electrolyte solution with an addition of a compound other than the concomitant additive may be employed. Alternatively, a method of generating the concomitant additive by producing a battery and applying an electrical load thereto through charging, discharging or the like may be employed.

When a concomitant additive is incorporated into a nonaqueous electrolyte solution and actually used for the production of an energy device, the content of the concomitant additive in the nonaqueous electrolyte solution is often markedly reduced even if the resulting battery is disassembled and the nonaqueous electrolyte solution is extracted therefrom. Accordingly, a nonaqueous electrolyte solution which is extracted from a battery and in which a concomitant additive is detectable even in an extremely small amount is deemed to be included in the present invention. Further, when a concomitant additive is actually used in a nonaqueous electrolyte solution for the production of an energy device, even if the concomitant is contained only in an extremely small amount in the nonaqueous electrolyte solution extracted from the resulting battery by disassembly, the concomitant additive is often detected on other structural member of the energy device, such as a positive electrode, a negative electrode, or a separator. Accordingly, when the concomitant additive is detected from a positive electrode, a negative electrode or a separator, it can be assumed that the nonaqueous electrolyte solution contained the concomitant additive in the total detected amount. Based on this assumption, it is preferred that a concomitant additive be contained in the below-described range.

[1-1. Compound Represented by Formula (1)]

The nonaqueous electrolyte solution of the present invention is characterized by containing a compound represented by the following Formula (1) which has an "unsaturated silane moiety" and an "organic group-containing oxygen moiety":

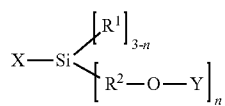

(1)

wherein, X represents an optionally substituted unsaturated hydrocarbon group having 2 to 5 carbon atoms and at least one unsaturated carbon-carbon bond; Y represents an organic group having 1 to 10 carbon atoms, which is constituted by atoms selected from the group consisting of a carbon atom, a hydrogen atom, an oxygen atom, a sulfur atom, and a phosphorus atom; $R^1$ represents a hydrogen atom, a halogen atom, or an unsubstituted or halogen atom-substituted hydrocarbon group having 1 to 10 carbon atoms; $R^2$ represents an unsubstituted or halogen atom-substituted hydrocarbon group having 1 to 10 carbon atoms; n represents an integer of 1 to 3; if the compound includes plural $R^1$, each $R^1$ is the same or different from the other; if the compound includes plural $R^2$, each $R^2$ is the same or different from the other; and if the compound includes plural Y, each Y is the same or different from the other, with a proviso that $R^2$ and one selected from X and Y are not bound with each other to form a ring.

In Formula (1), n is an integer of 1 to 3, preferably 2 or less, more preferably 1. When n is in this range, chelating coordination to a positive electrode metal oxide using the unsaturated silane moiety and the oxygen moiety readily occurs efficiently, so that a property-improving effect can be exerted efficiently.

In Formula (1), X is not particularly restricted as long as it is an unsaturated hydrocarbon group having 2 to 5 carbon atoms and at least one unsaturated carbon-carbon bond, and X optionally has a substituent. Examples of the substituent include a hydrocarbon group, an isocyanato group, an acyl group, an oxycarbonyl group, an alkoxy group, a halogen atom, and a halogen atom-containing group. The substituent is preferably a hydrocarbon group or a halogen atom, particularly preferably an alkyl group or a fluorine atom. The unsaturated carbon-carbon bond is a carbon-carbon double bond or a carbon-carbon triple bond, and a single X may contain two or more unsaturated carbon-carbon bonds, and may contain both a carbon-carbon double bond and a carbon-carbon triple bond. Particularly, this X is preferably an unsaturated hydrocarbon group having at least one carbon-carbon double bond or an unsaturated hydrocarbon group having at least one carbon-carbon triple bond, more preferably an unsaturated hydrocarbon group having at least one carbon-carbon double bond.

More specifically, the unsaturated hydrocarbon group of X may be a linear or branched aliphatic hydrocarbon group, and it is preferably an aliphatic unsaturated hydrocarbon group having at least one carbon-carbon double bond or an aliphatic unsaturated hydrocarbon group having at least one carbon-carbon triple bond, more preferably an aliphatic unsaturated hydrocarbon group having at least one carbon-carbon double bond. X is preferably any of these unsaturated hydrocarbon groups since this allows the compound to act more strongly on a positive electrode.

Further, the unsaturated hydrocarbon group of X in Formula (1) is preferably an unsaturated hydrocarbon group having no substituent other than a hydrocarbon group, or an unsaturated hydrocarbon group in which some of hydrogen atoms are substituted with fluorine atoms, more preferably an unsaturated hydrocarbon group having no substituent other than a hydrocarbon group, still more preferably an unsaturated hydrocarbon group having no substituent at all. When X is any of these groups, since chelating coordination to a positive electrode metal oxide using the unsaturated silane moiety and the oxygen moiety is not inhibited, the compound can be more effectively coordinated to a positive electrode, so that the effects of the present invention such as reduction of the gas generation during a high-temperature storage durability test can be obtained, which is preferred.

Moreover, in Formula (1), the number of carbon atoms in the unsaturated hydrocarbon group of X is 2 or more but 5 or less, preferably 4 or less, more preferably 3 or less. When the number of carbon atoms is in this range, the compound represented by Formula (1) has excellent solubility in the electrolyte solution. From the standpoint of reducing the initial discharge resistance of an energy device, the compound represented by Formula (1) particularly preferably has an unsaturated carbon-carbon bond at a terminal. When the hydrocarbon group has a branched chain, the number of carbon atoms is defined as the number of carbon atoms in a main chain that is the longest linear chain bound to the Si atom.

Specific examples of X in Formula (1) include the followings.

<<Aliphatic Unsaturated Hydrocarbon Group Having at Least One Carbon-Carbon Double Bond>>

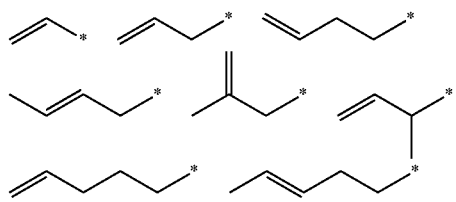

-continued

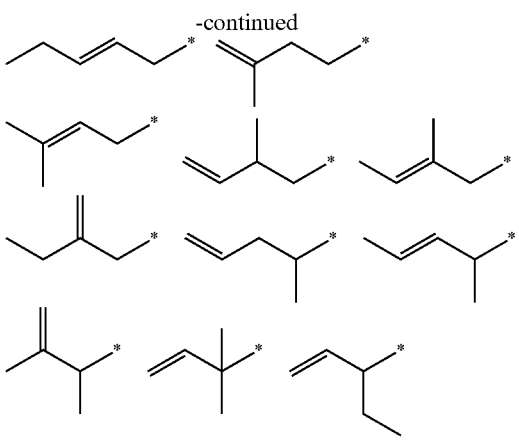

It is noted here that * represents a binding site with the silicon atom of the compound represented by Formula (1). The same applies below.

<<Aliphatic Unsaturated Hydrocarbon Group Having at Least One Carbon-Carbon Triple Bond>>

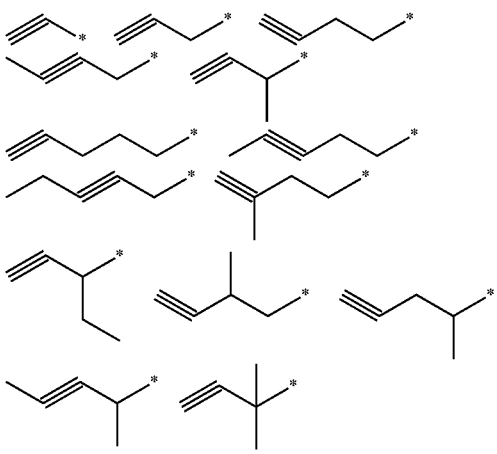

Among these hydrocarbon groups, the following vinyl group, ally group, and ethynyl group are preferred.

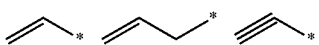

Among these groups, a vinyl group is more preferred.

In Formula (1), $R^1$ is not particularly restricted as long as it is a hydrogen atom, a halogen atom, or an unsubstituted or halogen atom-substituted hydrocarbon group having 1 to 10 carbon atoms; however, $R^1$ is preferably a linear or branched aliphatic hydrocarbon group, more preferably an unsubstituted alkyl group, or an alkyl group in which some of hydrogen atoms are substituted with fluorine atoms, still more preferably an unsubstituted alkyl group. Specific examples of $R^1$ include a methyl group, an ethyl group, a propyl group, an iso-propyl group, a butyl group, a tert-butyl group, a pentyl group, a hexyl group, a heptyl group, an octyl group, a nonyl group, a decyl group, a fluoromethyl group, a trifluoromethyl group, and a pentafluoroethyl group. When $R^1$ is any of these groups, since chelating coordination to a positive electrode metal oxide using the unsaturated silane moiety and the oxygen moiety is not inhibited, the compound can be more effectively coordinated to a positive electrode, so that the effects of the present invention, such as reduction of the initial discharge resistance and inhibition of the gas generation during a high-temperature storage durability test, can be obtained, which is preferred. In Formula (1), when there are plural $R^1$s, the $R^1$s are optionally the same or different from each other.

Further, in Formula (1), the number of carbon atoms in the hydrocarbon group of $R^1$ is 1 or more but 10 or less, preferably 5 or less, more preferably 4 or less, still more preferably 2 or less. When the number of carbon atoms is in this range, the compound represented by Formula (1) has excellent solubility in the electrolyte solution.

In Formula (1), $R^2$ is not particularly restricted as long as it is an unsubstituted or halogen atom-substituted hydrocarbon group having 1 to 10 carbon atoms; however, $R^2$ is preferably an aliphatic hydrocarbon group, more preferably an unsubstituted alkylene group, or an alkylene group in which some of hydrogen atoms are substituted with fluorine atoms, still more preferably an unsubstituted alkylene group. When $R^2$ is any of these groups, the degree of freedom between the unsaturated silane moiety and the oxygen moiety is high and a chelate coordination structure is easily formed on a positive electrode metal oxide; therefore, the compound can be effectively coordinated to a positive electrode, so that the effects of the present invention such as reduction of the gas generation during a high-temperature storage durability test can be obtained, which is preferred. When there are plural $R^2$s, the $R^2$s are optionally the same or different from each other.

Further, in Formula (1), the number of carbon atoms in the hydrocarbon group of $R^2$ is 1 or more, preferably 2 or more, but 10 or less, preferably 5 or less, more preferably 4 or less. When the number of carbon atoms is in this range, the compound represented by Formula (1) has excellent solubility in the electrolyte solution.

In Formula (1), Y is not particularly restricted as long as it is an organic group having 1 to 10 carbon atoms, which is constituted by atoms selected from the group consisting of a carbon atom, a hydrogen atom, an oxygen atom, a sulfur atom, and a phosphorus atom. Specific examples of Y include an alkyl group, an alkenyl group, an alkynyl group, an aryl group, an alkoxy group, an alkyloxycarbonyl group, an alkenyloxycarbonyl group, an alkynyloxycarbonyl group, an alkylcarbonyl group, an alkenylcarbonyl group, an alkynylcarbonyl group, an arylcarbonyl group, an alkylsulfonyl group, an alkenylsulfonyl group, an alkynylsulfonyl group, an alkyloxysulfonyl group, an alkenyloxysulfonyl group, a dialkylphosphoryl group, a dialkenylphosphoryl group, a dialkynylphosphoryl group, an alkyl(alkyloxy)phosphoryl group, and a bis(alkyloxy)phosphoryl group. Y is preferably a hydrocarbon group (e.g., an alkyl group), an alkyloxycarbonyl group, an alkylcarbonyl group, an alkylsulfonyl group, a dialkylphosphoryl group, an alkyl(alkyloxy)phosphoryl group, or a bis(alkyloxy)phosphoryl group, more preferably a hydrocarbon group (e.g., an alkyl group), an alkyloxycarbonyl group, an alkylsulfonyl group, or an alkylcarbonyl group, still more preferably an alkyloxycarbonyl group or an alkylsulfonyl group, particularly preferably an alkylsulfonyl group.

When Y is any of these groups, not only chelating coordination to a positive electrode metal oxide using the unsaturated silane moiety and the oxygen moiety is not inhibited, but also the charge of the oxygen moiety is adjusted appropriately and the compound can thereby be more effectively coordinated to a positive electrode, so that the effects of the present invention, such as reduction of the initial discharge resistance and inhibition of the gas generation during a high-temperature storage durability test, can be obtained, which is preferred.

In the above-described alkyl group, alkyloxycarbonyl group, alkylcarbonyl group, alkylsulfonyl group, dialkylphosphoryl group, alkyl(alkyloxy)phosphoryl group, and bis(alkyloxy)phosphoryl group, the number of carbon atoms in the respective alkyl moieties is 1 or more, but preferably 5 or less, more preferably 3 or less, still more preferably 2 or less.

Examples of the compound represented by Formula (1) include the following compounds. It is noted here that Me, Et, n-Pr, i-Pr, n-Bu, and i-Bu represent a methyl group, an ethyl group, an n-propyl group, an iso-propyl group, an n-butyl group, and an iso-butyl group, respectively, and m represents an integer of 1 to 10.

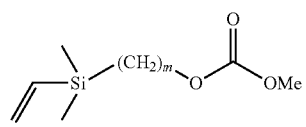

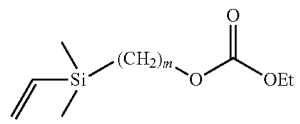

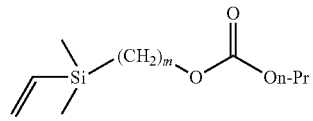

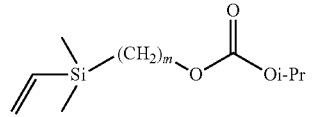

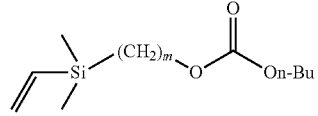

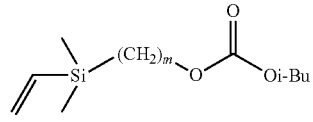

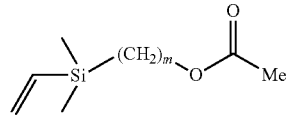

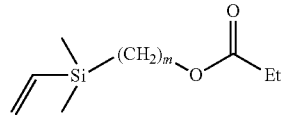

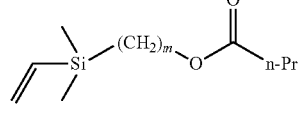

-continued

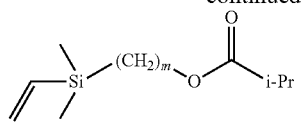

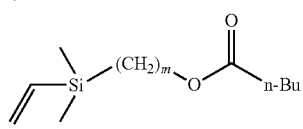

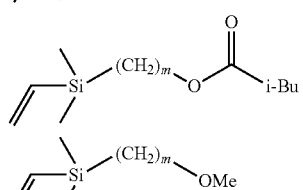

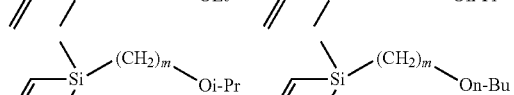

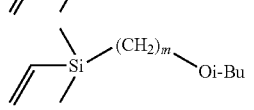

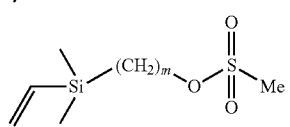

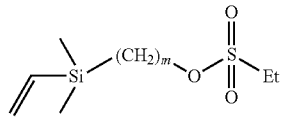

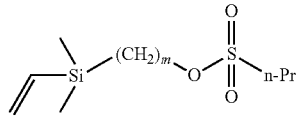

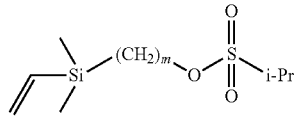

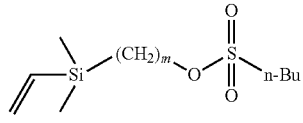

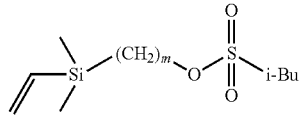

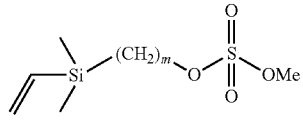

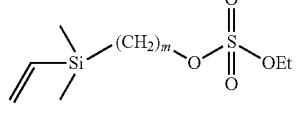

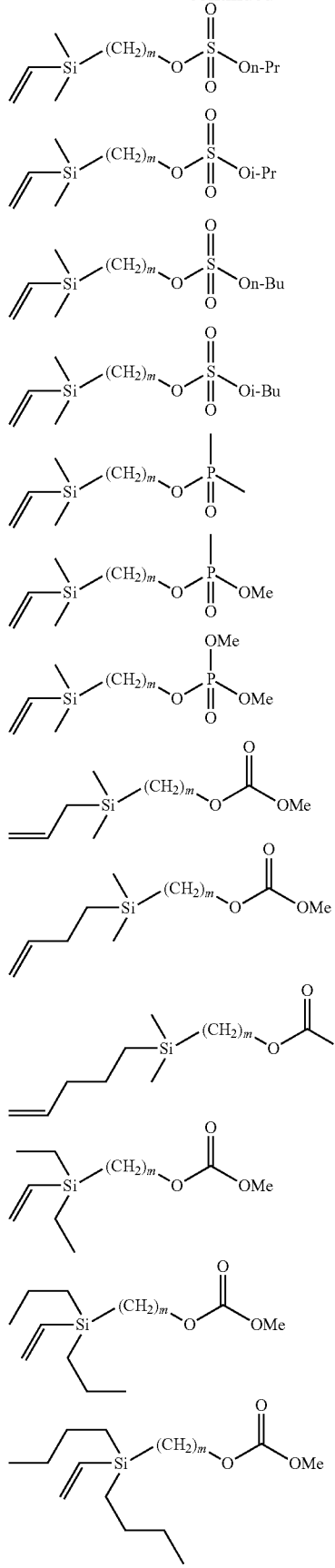
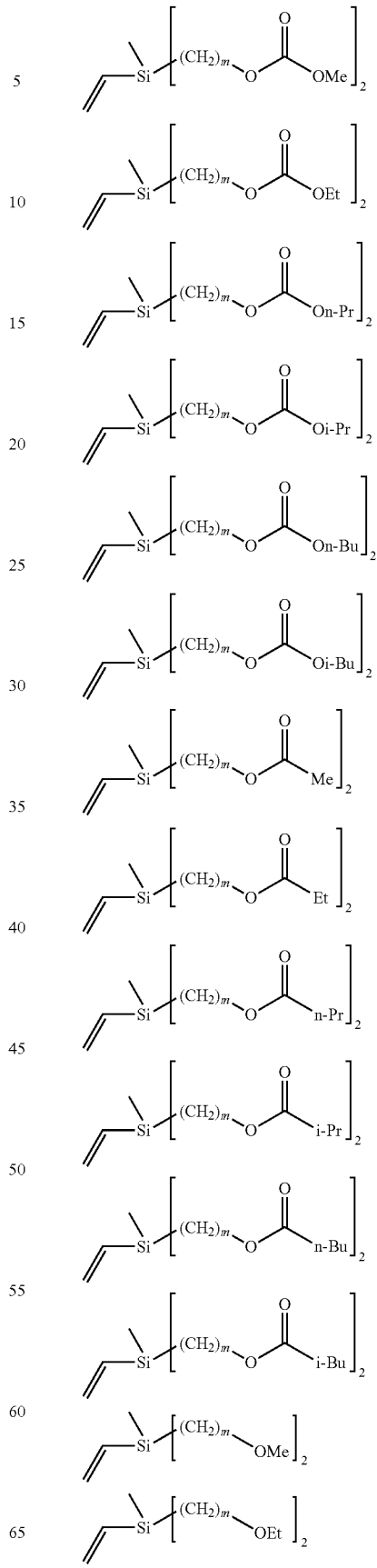

-continued
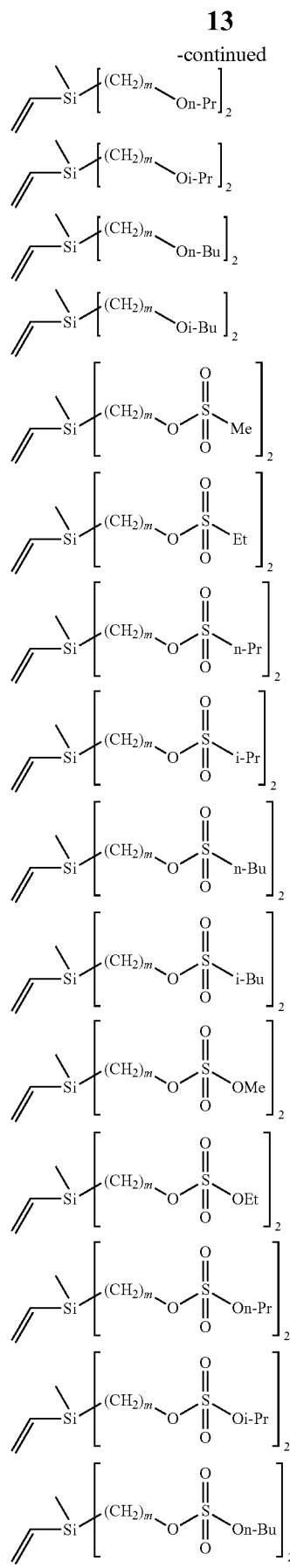
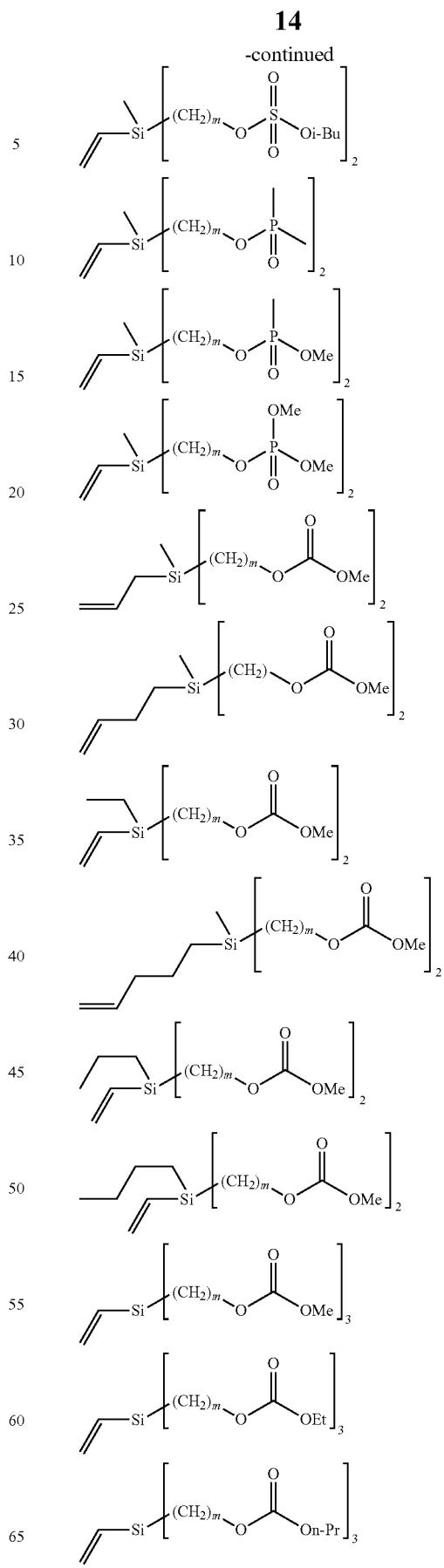

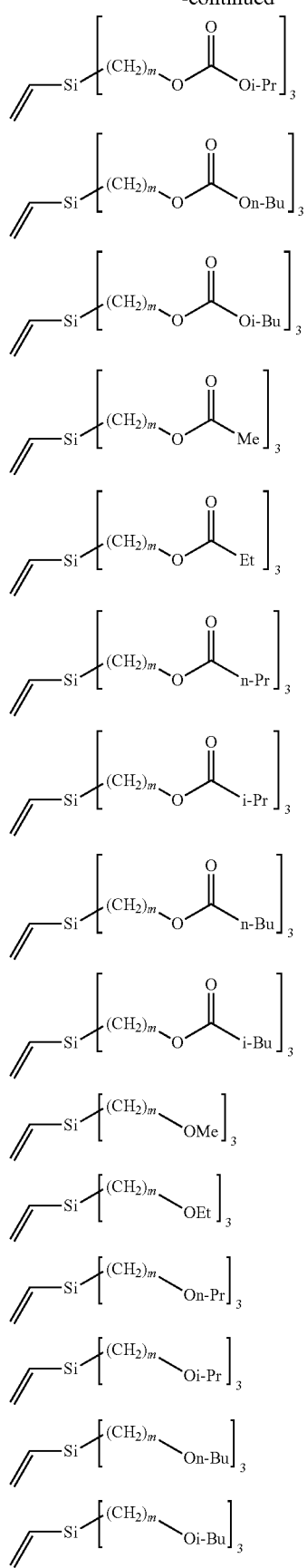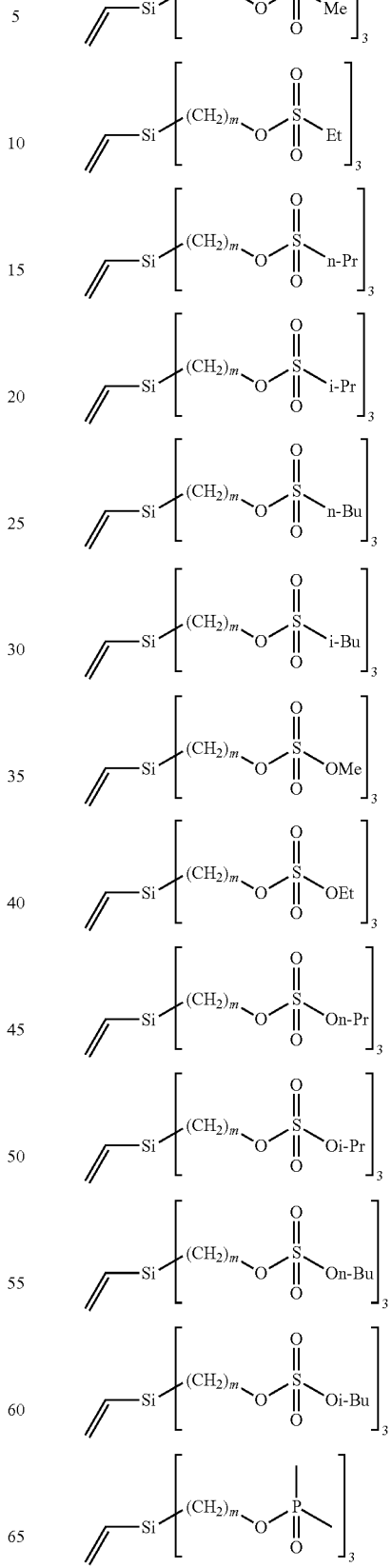

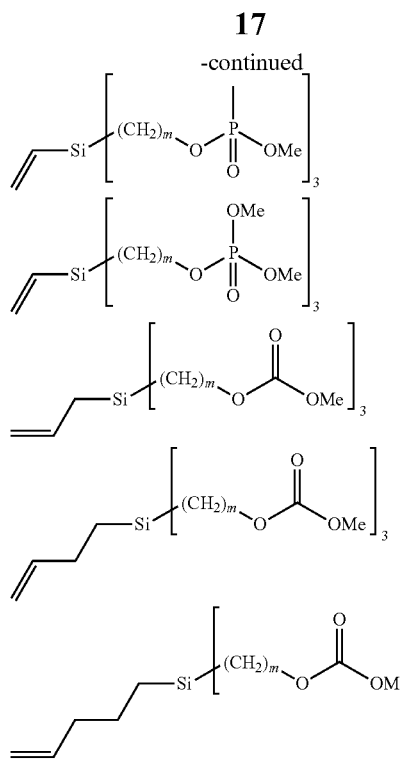
Among the above-exemplified compounds, those in which m is an integer of 1 to 5 are preferred. The compound represented by Formula (1) is more preferably any of the following compounds.
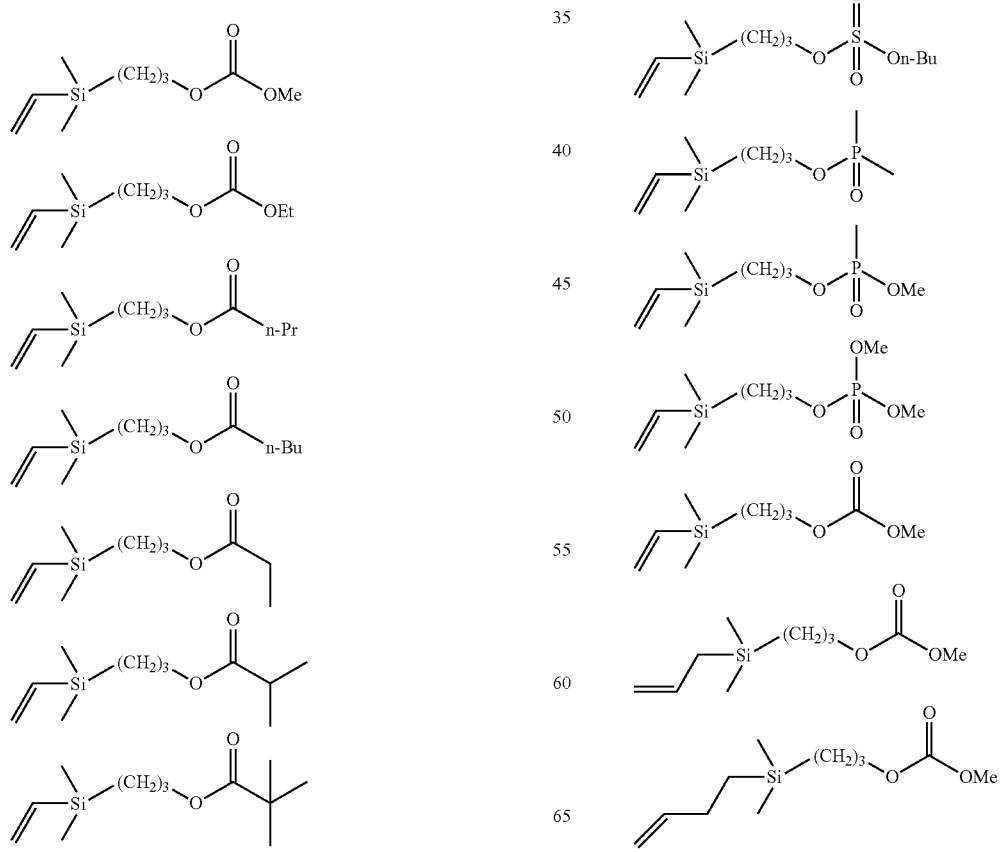

-continued

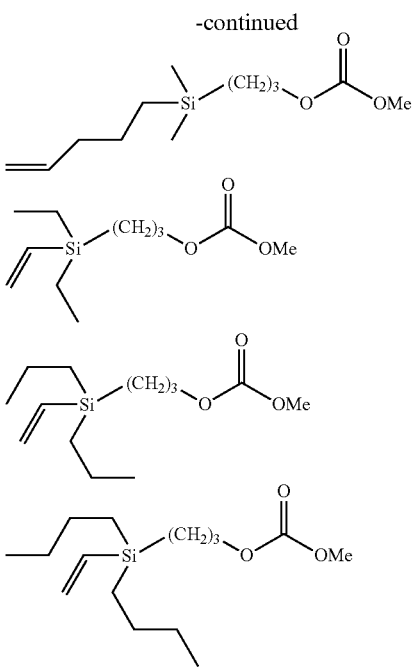

The content of the compound represented by Formula (1) is not particularly restricted; however, the content of the compound represented by Formula (1) (a total amount when two or more compounds represented by Formula (1) are contained) is usually not less than 0.001% by mass, preferably not less than 0.01% by mass, more preferably not less than 0.1% by mass, still more preferably not less than 0.2% by mass, particularly preferably not less than 0.5% by mass, but preferably 10% by mass or less, more preferably 7% by mass or less, still more preferably 5% by mass or less, particularly preferably 3% by mass or less, with respect to a total amount of the nonaqueous electrolyte solution. When the content of the compound represented by Formula (1) is in this range, the effect of reducing the initial discharge resistance is exerted prominently.

The compound represented by Formula (1) is identified and the content thereof is measured by nuclear magnetic resonance (NMR) spectroscopy.

[1-2. Electrolyte]

<Lithium Salt>

As the electrolyte in the nonaqueous electrolyte solution, a lithium salt is usually used. The lithium salt is not particularly restricted as long as it is known to be used in this application, and any one or more lithium salts, specific examples of which include the followings, can be used.

Specific examples of the lithium salt include:

lithium fluoroborates, such as $LiBF_4$;

lithium fluorophosphates, such as $LiPF_6$, $Li_2PO_3F$, and $LiPO_2F_2$;

lithium tungstates, such as $LiWOF_5$;

lithium carboxylates, such as $CF_3CO_2Li$;

lithium sulfonates, such as $CH_3SO_3Li$ and $FSO_3Li$;

lithium imide salts, such as $LiN(FSO_2)_2$, $LiN(FSO_2)(CF_3SO_2)$, $LiN(CF_3SO_2)_2$, $LiN(C_2F_5SO_2)_2$, lithium cyclic 1,2-perfluoroethane disulfonylimide, and lithium cyclic 1,3-perfluoropropane disulfonylimide;

lithium methide salts, such as $LiC(FSO_2)_3$, $LiC(CF_3SO_2)_3$, and $LiC(C_2F_5SO_2)_3$; and lithium oxalate salts, such as lithium difluorooxalatoborate, lithium bis(oxalato)borate, lithium tetrafluoro(oxalato)phosphate, lithium difluoro-bis(oxalato)phosphate, and lithium tris(oxalato)phosphate.

Examples of a combination of two or more electrolyte salts include, but not particularly limited to: $LiPF_6$ and $LiN(FSO_2)_2$; $LiPF_6$ and $LiBF_4$; $LiPF_6$ and $LiN(CF_3SO_2)_2$; $LiBF_4$ and $LiN(FSO_2)_2$; and $LiBF_4$, $LiPF_6$, and $LiN(FSO_2)_2$. Thereamong, combinations of $LiPF_6$ and $LiN(FSO_2)_2$; $LiPF_6$ and $LiBF_4$; and $LiBF_4$, $LiPF_6$, and $LiN(FSO_2)_2$ are preferred.

From the standpoint of further enhancing the effects of improving the charge-discharge rate characteristics and the impedance characteristics in addition to the effect of improving the charged storage characteristics under a high-temperature environment that is attained in the present invention, the lithium salt is preferably one selected from lithium fluoroborates, lithium fluorophosphates, lithium sulfonates, lithium imide salts, and lithium oxalate salts, more preferably a lithium fluorosulfonate.

A total electrolyte concentration in the nonaqueous electrolyte solution is not particularly restricted; however, it is usually 8% by mass or higher, preferably 8.5% by mass or higher, more preferably 9% by mass or higher, based on a total amount of the nonaqueous electrolyte solution. An upper limit of the total electrolyte concentration is usually 18% by mass or lower, preferably 17% by mass or lower, more preferably 16% by mass or lower. When the total electrolyte concentration is in this range, the nonaqueous electrolyte solution has an electrical conductivity appropriate for battery operation, so that sufficient output characteristics tend to be obtained.

[1-3. Nonaqueous Solvent]

Similarly to a general nonaqueous electrolyte solution, the nonaqueous electrolyte solution of the present invention usually contains, as its main component, a nonaqueous solvent that dissolves the above-described electrolytes. The nonaqueous solvent is not particularly restricted, and any known organic solvent can be used. Examples of the organic solvent include, but not particularly limited to: a saturated cyclic carbonate, a linear carbonate, an ether-based compound, a sulfone-based compound, and a cyclic or linear carboxylic acid ester. These organic solvents may be used singly, or in combination of two or more thereof.

Examples of a combination of two or more organic solvents include, but not particularly limited to: a saturated cyclic carbonate and a linear carboxylic acid ester; a cyclic carboxylic acid ester and a linear carbonate; and a saturated cyclic carbonate, a linear carbonate, and a linear carboxylic acid ester. Thereamong, a combination of a saturated cyclic carbonate and a linear carbonate, and a combination of a saturated cyclic carbonate, a linear carbonate, and a linear carboxylic acid ester are preferred.

[1-3-1. Saturated Cyclic Carbonate]

The saturated cyclic carbonate is usually, for example, one having an alkylene group having 2 to 4 carbon atoms and, from the standpoint of attaining an improvement in the battery characteristics that is attributed to an increase in the degree of lithium ion dissociation, a saturated cyclic carbonate having 2 or 3 carbon atoms is preferably used.

Examples of the saturated cyclic carbonate include ethylene carbonate, propylene carbonate, and butylene carbonate. Thereamong, ethylene carbonate and propylene carbonate are preferred, and ethylene carbonate, which is unlikely to be oxidized or reduced, is more preferred. Any of these saturated cyclic carbonates may be used singly, or two or more thereof may be used in any combination at any ratio.

The content of the saturated cyclic carbonate is not particularly restricted and may be set arbitrarily as long as the effects of the present invention are not markedly impaired; however, it is usually not less than 3% by volume, preferably not less than 5% by volume, with respect to a total nonaqueous solvent amount of the nonaqueous electrolyte solution. By controlling the content of the saturated cyclic carbonate to be in this range, a decrease in the electrical conductivity caused by a reduction in the dielectric constant of the nonaqueous electrolyte solution is avoided, so that the high-current discharge characteristics of a nonaqueous electrolyte secondary battery, the stability to a negative electrode, and the cycle characteristics are all likely to be obtained in favorable ranges. Meanwhile, the content of the saturated cyclic carbonate is usually 90% by volume or less, preferably 85% by volume or less, more preferably 80% by volume or less. By controlling the content of the saturated cyclic carbonate to be in this range, the resistance of the nonaqueous electrolyte solution against oxidation and reduction is improved, so that the stability during high-temperature storage tends to be improved.

It is noted here that, in the present embodiment, "% by volume" means a volume at 25° C. and 1 atm.

[1-3-2. Linear Carbonate]

As the linear carbonate, one having 3 to 7 carbon atoms is usually used and, for the purpose of adjusting the viscosity of the electrolyte solution to be in an appropriate range, a linear carbonate having 3 to 5 carbon atoms is preferably used.

Specific examples of the linear carbonate include dimethyl carbonate, diethyl carbonate, di-n-propyl carbonate, diisopropyl carbonate, n-propyl isopropyl carbonate, ethyl methyl carbonate, and methyl-n-propyl carbonate. Thereamong, dimethyl carbonate, diethyl carbonate, and ethyl methyl carbonate are particularly preferred.

Further, a fluorine atom-containing linear carbonate (hereinafter, may be simply referred to as "fluorinated linear carbonate") can be preferably used as well. The number of fluorine atoms in the fluorinated linear carbonate is not particularly restricted as long as it is one or more; however, it is usually 6 or less, preferably 4 or less. When the fluorinated linear carbonate has plural fluorine atoms, the fluorine atoms may be bound to the same carbon, or may be bound to different carbons.

Examples of the fluorinated linear carbonate include: fluorinated dimethyl carbonate derivatives, such as fluoromethyl methyl carbonate; fluorinated ethyl methyl carbonate derivatives, such as 2-fluoroethyl methyl carbonate; and fluorinated diethyl carbonate derivatives, such as ethyl-(2-fluoroethyl)carbonate.

Any of the above-described linear carbonates may be used singly, or two or more thereof may be used in any combination at any ratio.

The content of the linear carbonate is not particularly restricted; however, it is usually not less than 15% by volume, preferably not less than 20% by volume, more preferably not less than 25% by volume, but usually 90% by volume or less, preferably 85% by volume or less, more preferably 80% by volume or less, with respect to a total nonaqueous solvent amount of the nonaqueous electrolyte solution. By controlling the content of the linear carbonate to be in this range, the viscosity of the nonaqueous electrolyte solution is kept in an appropriate range and a reduction in the ionic conductivity is inhibited, as a result of which the output characteristics of a nonaqueous electrolyte secondary battery are likely to be attained in favorable ranges.

Moreover, the battery performance can be markedly improved by incorporating a specific amount of ethylene carbonate in combination with a specific linear carbonate.

For example, when dimethyl carbonate and ethyl methyl carbonate are selected as specific linear carbonates, the content of ethylene carbonate is not particularly restricted and may be set arbitrarily as long as the effects of the present invention are not markedly impaired; however, it is usually not less than 15% by volume, preferably not less than 20% by volume, but usually 45% by volume or less, preferably 40% by volume or less, with respect to a total nonaqueous solvent amount of the nonaqueous electrolyte solution; the content of dimethyl carbonate is usually not less than 20% by volume, preferably not less than 30% by volume, but usually 50% by volume or less, preferably 45% by volume or less, with respect to a total nonaqueous solvent amount of the nonaqueous electrolyte solution; and the content of ethyl methyl carbonate is usually not less than 20% by volume, preferably not less than 30% by volume, but usually 50% by volume or less, preferably 45% by volume or less. By controlling these content values to be in the above-described respective ranges, excellent high-temperature stability is obtained and gas generation tends to be inhibited.

[1-3-3. Ether-Based Compound]

The ether-based compound is preferably a linear ether having 3 to 10 carbon atoms, such as dimethoxymethane, diethoxymethane, ethoxymethoxymethane, ethylene glycol di-n-propyl ether, ethylene glycol di-n-butyl ether or diethylene glycol dimethyl ether, or a cyclic ether having 3 to 6 carbon atoms, such as tetrahydrofuran, 2-methyltetrahydrofuran, 3-methyltetrahydrofuran, 1,3-dioxane, 2-methyl-1,3-dioxane, 4-methyl-1,3-dioxane, or 1,4-dioxane. It is noted here that some of hydrogen atoms in these ether-based compounds may be substituted with fluorine atoms.

Among the above-described ether-based compounds, a linear ether having 3 to 10 carbon atoms is preferred since it has a high solvating capacity with lithium ions and thus improves the ion dissociation. Particularly preferred are dimethoxymethane, diethoxymethane, and ethoxymethoxymethane since they have a low viscosity and provide a high ionic conductivity.

As the cyclic ether having 3 to 6 carbon atoms, for example, tetrahydrofuran, 1,3-dioxane, and 1,4-dioxane are preferred since they provide a high ionic conductivity.

The content of the ether-based compound is not particularly restricted and may be set arbitrarily as long as the effects of the present invention are not markedly impaired; however, it is usually not less than 1% by volume, preferably not less than 2% by volume, more preferably not less than 3% by volume, but usually 30% by volume or less, preferably 25% by volume or less, more preferably 20% by volume or less, in 100% by volume of the nonaqueous solvent. When the content of the ether-based compound is in this preferred range, an ionic conductivity-improving effect of ether, which is attributed to an increase in the degree of lithium ion dissociation and a reduction in the viscosity, is likely to be ensured. In addition, when a carbonaceous material is used as a negative electrode active material, the phenomenon of co-intercalation of a linear ether thereto along with lithium ions can be inhibited; therefore, the input-output characteristics and the charge-discharge rate characteristics can be attained in appropriate ranges.

[1-3-4. Sulfone-Based Compound]

The sulfone-based compound is not particularly restricted and may be a cyclic sulfone or a linear sulfone. In the case of a cyclic sulfone, the number of its carbon atoms is usually 3 to 6, preferably 3 to 5, while in the case of a linear sulfone, the number of its carbon atoms is usually 2 to 6, preferably 2 to 5. The number of sulfonyl groups in one molecule of the sulfone-based compound is also not particularly restricted; however, it is usually 1 or 2.

Examples of the cyclic sulfone include: monosulfone compounds, such as trimethylene sulfones, tetramethylene sulfones, and hexamethylene sulfones; and disulfone compounds, such as trimethylene disulfones, tetramethylene disulfones, and hexamethylene disulfones. Thereamong, from the standpoints of the dielectric constant and the viscosity, tetramethylene sulfones, tetramethylene disulfones, hexamethylene sulfones, and hexamethylene disulfones are more preferred, and tetramethylene sulfones (sulfolanes) are particularly preferred.

As the sulfolanes, sulfolane and sulfolane derivatives are preferred. As the sulfolane derivatives, those in which one or more hydrogen atoms bound to carbon atoms constituting a sulfolane ring are each substituted with a fluorine atom, an alkyl group, or a fluorine-substituted alkyl group are preferred.

Thereamong, for example, 2-methyl sulfolane, 3-methyl sulfolane, 2-fluorosulfolane, 3-fluorosulfolane, 2,3-difluorosulfolane, 2-trifluoromethyl sulfolane, and 3-trifluoromethyl sulfolane are preferred from the standpoint of attaining a high ionic conductivity and a high input/output.

Examples of the linear sulfone include dimethyl sulfone, ethyl methyl sulfone, diethyl sulfone, monofluoromethyl methyl sulfone, difluoromethyl methyl sulfone, trifluoromethyl methyl sulfone, and pentafluoroethyl methyl sulfone. Thereamong, dimethyl sulfone, ethyl methyl sulfone, and monofluoroethyl methyl sulfone are preferred from the standpoint of improving the high-temperature storage stability of the electrolyte solution.

The content of the sulfone-based compound is not particularly restricted and may be set arbitrarily as long as the effects of the present invention are not markedly impaired; however, it is usually not less than 0.3% by volume, preferably not less than 0.5% by volume, more preferably not less than 1% by volume, but usually 40% by volume or less, preferably 35% by volume or less, more preferably 30% by volume or less, with respect to a total nonaqueous solvent amount of the nonaqueous electrolyte solution. When the content of the sulfone-based compound is in this range, an electrolyte solution having excellent high-temperature storage stability tends to be obtained.

[1-3-5. Cyclic or Linear Carboxylic Acid Ester]

Examples of the cyclic carboxylic acid ester include γ-butyrolactone and γ-valerolactone. Thereamong, γ-butyrolactone is particularly preferred from the standpoint of attaining an improvement in the battery characteristics that is attributed to an increase in the degree of lithium ion dissociation. Cyclic carboxylic acid esters obtained by substituting some of hydrogen atoms of the above-described compounds with fluorine atoms can be suitably used as well.

The content of the cyclic carboxylic acid ester is usually not less than 1% by volume, preferably not less than 5% by volume, more preferably not less than 10% by volume, with respect to a total nonaqueous solvent amount of the nonaqueous electrolyte solution. When the content of the cyclic carboxylic acid ester is in this range, the electrical conductivity of the nonaqueous electrolyte solution is increased, so that the high-current discharge characteristics of an energy device are likely to be improved. Meanwhile, the content of the cyclic carboxylic acid ester is usually 70% by volume or less, preferably 50% by volume or less, more preferably 40% by volume or less, with respect to a total nonaqueous solvent amount of the nonaqueous electrolyte solution. By setting an upper limit in this manner, the viscosity of the nonaqueous electrolyte solution is kept in an appropriate range and a reduction in the electrical conductivity is inhibited, so that an increase in the negative electrode resistance is inhibited and the high-current discharge characteristics of an energy device are likely to be attained in favorable ranges.

Examples of the linear carboxylic acid ester include methyl acetate, ethyl acetate, propyl acetate, butyl acetate, methyl propionate, ethyl propionate, propyl propionate, methyl butyrate, ethyl butyrate, methyl isobutyrate, ethyl isobutyrate, methyl valerate, and methyl pivalate.

Thereamong, methyl acetate, ethyl acetate, propyl acetate, or butyl acetate is preferred from the standpoints of reducing side reactions on the negative electrode and improving the ionic conductivity through a reduction in the viscosity of the electrolyte solution.

When a linear carboxylic acid ester is used as the nonaqueous solvent, the content thereof is preferably not less than 1% by volume, more preferably not less than 5% by volume, still more preferably not less than 10% by volume, yet still more preferably not less than 20% by volume, but 50% by volume or less, more preferably 45% by volume or less, still more preferably 40% by volume or less, with respect to a total nonaqueous solvent amount of the nonaqueous electrolyte solution. By controlling the content of the linear carboxylic acid ester to be in this range, the electrical conductivity of the nonaqueous electrolyte solution is increased, so that the input-output characteristics and the charge-discharge rate characteristics of a nonaqueous electrolyte secondary battery are likely to be improved. In addition, an increase in the negative electrode resistance is inhibited, so that the input-output characteristics and the charge-discharge rate characteristics of a nonaqueous electrolyte secondary battery are likely to be attained in favorable ranges.

It is noted here that, when a linear carboxylic acid ester is used as the nonaqueous solvent, it is preferably used in combination with a cyclic carbonate, and it is more preferably used in combination with a cyclic carbonate and a linear carbonate.

For example, when a cyclic carbonate and a linear carboxylic acid ester are used in combination, the content of the cyclic carbonate is not particularly restricted and may be set arbitrarily as long as the effects of the present invention are not markedly impaired; however, it is usually not less than 15% by volume, preferably not less than 20% by volume, but usually 45% by volume or less, preferably 40% by volume or less, and the content of the linear carboxylic acid ester is usually not less than 20% by volume, preferably not less than 30% by volume, but usually 55% by volume or less, preferably 50% by volume or less. Further, when a cyclic carbonate, a linear carbonate, and a linear carboxylic acid ester are used in combination, the content of the cyclic carbonate is not particularly restricted and may be set arbitrarily as long as the effects of the present invention are not markedly impaired; however, it is usually not less than 15% by volume, preferably not less than 20% by volume, but usually 45% by volume or less, preferably 40% by volume or less, and the content of the linear carbonate is usually not less than 25% by volume, preferably not less than 30% by volume, but usually 84% by volume or less, preferably 80% by volume or less. By controlling these content values to be in the above-described respective ranges, the viscosity of the nonaqueous electrolyte solution can be reduced and the ionic conductivity can be increased while lowering the low-temperature precipitation point of electrolytes, so that not only a further increased input/output can be attained even at low temperatures but also battery swelling can be further reduced, which is preferred.

[1-4. Auxiliary Agent]

The nonaqueous electrolyte solution of the present invention may also contain a variety of auxiliary agents within a range that the effects of the present invention are exerted. As the auxiliary agents, conventionally known auxiliary agents can be used arbitrarily. Any of such auxiliary agents may be used singly, or two or more thereof may be used in any combination at any ratio.

Examples of the auxiliary agents that may be incorporated into the nonaqueous electrolyte solution include a cyclic carbonate having an unsaturated carbon-carbon bond, a monofluorophosphate, a difluorophosphate, a fluorine-containing cyclic carbonate, a sulfur-containing organic compound, a phosphorus-containing organic compound, a compound having an isocyanato group (isocyanate group), a silicon-containing compound, an aromatic compound, a fluorine-free carboxylic acid ester, an ether bond-containing cyclic compound, a carboxylic acid anhydride, a borate, an oxalate, and a fluorosulfonate. Specific examples the auxiliary agents include those compounds that are described in WO 2015/111676.

An ether bond-containing cyclic compound can be used as an auxiliary agent in the nonaqueous electrolyte solution, and encompasses those that can be used as nonaqueous solvents as described above in 1-3. When an ether bond-containing cyclic compound is used as an auxiliary agent, it is used in an amount of less than 4% by mass. A borate, an oxalate, and a fluorosulfonate can each be used as an auxiliary agent in the nonaqueous electrolyte solution, and encompass those that can be used as electrolytes as described above in 1-2. When these compounds are used as auxiliary agents, they are used in an amount of less than 3% by mass.

The cyclic carbonate having an unsaturated carbon-carbon bond, the monofluorophosphate, and the difluorophosphate will now be described.

[1-4-1. Cyclic Carbonate Compound Having Unsaturated Carbon-Carbon Bond>

The cyclic carbonate having an unsaturated carbon-carbon bond (hereinafter, also referred to as "unsaturated cyclic carbonate") is not particularly restricted as long as it is a cyclic carbonate having a carbon-carbon double bond or a carbon-carbon triple bond. It is noted here that the term "unsaturated cyclic carbonate" used herein also encompasses a cyclic carbonate having an aromatic ring.

Examples of the unsaturated cyclic carbonate include: vinylene carbonates; ethylene carbonates substituted with a substituent having an aromatic ring, a carbon-carbon double bond, or a carbon-carbon triple bond; phenyl carbonates; vinyl carbonates; allyl carbonates; and catechol carbonates. Thereamong, the unsaturated cyclic carbonate is preferably a vinylene carbonate, or an ethylene carbonate substituted with a substituent having an aromatic ring, a carbon-carbon double bond, or a carbon-carbon triple bond.

Specific examples of the unsaturated cyclic carbonate include: vinylene carbonates, such as vinylene carbonate, methylvinylene carbonate, 4,5-dimethylvinylene carbonate, phenylvinylene carbonate, 4,5-diphenylvinylene carbonate, vinylvinylene carbonate, 4,5-vinylvinylene carbonate, allylvinylene carbonate, and 4,5-diallylvinylene carbonate; and ethylene carbonates substituted with a substituent having an aromatic ring, a carbon-carbon double bond, or a carbon-carbon triple bond, such as vinylethylene carbonate, 4,5-divinylethylene carbonate, 4-methyl-5-vinylethylene carbonate, 4-allyl-5-vinylethylene carbonate, ethynylethylene carbonate, 4,5-diethynylethylene carbonate, 4-methyl-5-ethynylethylene carbonate, 4-vinyl-5-ethynylethylene carbonate, 4-allyl-5-ethynylethylene carbonate, phenylethylene carbonate, 4,5-diphenylethylene carbonate, 4-phenyl-5-vinylethylene carbonate, 4-allyl-5-phenylethylene carbonate, allylethylene carbonate, 4,5-diallylethylene carbonate, and 4-methyl-5-allylethylene carbonate.

Thereamong, vinylene carbonate, vinylethylene carbonate, and ethynylethylene carbonate are preferred since they each yield a more stable interface protective film. Vinylene carbonate and vinylethylene carbonate are more preferred, and vinylene carbonate is still more preferred.

The unsaturated cyclic carbonate may be used singly, or two or more thereof may be used in any combination at any ratio. The amount of the unsaturated cyclic carbonate (a total amount when two or more unsaturated cyclic carbonates are used) is usually not less than 0.001% by mass, preferably not less than 0.01% by mass, more preferably not less than 0.1% by mass, but preferably 5% by mass or less, more preferably 4% by mass or less, still more preferably 3% by mass or less, with respect to a total amount of the nonaqueous electrolyte solution. When the amount of the unsaturated cyclic carbonate is in this range, a nonaqueous electrolyte secondary battery is likely to exhibit a sufficient cycle characteristics-improving effect, and a situation where the high-temperature storage characteristics are deteriorated and the amount of gas generation is thereby increased and the discharge capacity retention rate is reduced is likely to be avoided.

The mass ratio between the compound represented by Formula (1) and the unsaturated cyclic carbonate (a total amount when two or more unsaturated cyclic carbonates are used), [compound represented by Formula (1): unsaturated cyclic carbonate], is usually 1:100 or higher, preferably 10:100 or higher, more preferably 20:100 or higher, still more preferably 25:100 or higher, but usually 10,000:100 or lower, preferably 500:100 or lower, more preferably 300:100 or lower, still more preferably 100:100 or lower, particularly preferably 75:100 or lower, most preferably 50:100 or lower. When the mass ratio is in this range, the battery characteristics, particularly the durability characteristics can be markedly improved. Although the mechanism of this effect is not clear, it is believed that, by mixing these compounds at the above-described ratio, side reactions of additives on electrodes are minimized.

[1-4-2. Monofluorophosphate and Difluorophosphate]

The monofluorophosphate and the difluorophosphate are not particularly restricted as long as they are each a salt having at least one monofluorophosphate or difluorophosphate structure in the molecule. By using the above-described compound represented by Formula (1) in combination with one or more selected from monofluorophosphates and difluorophosphates in the electrolyte solution of the present embodiment, the durability characteristics of a battery containing this electrolyte solution can be improved.

Counter cations of the monofluorophosphate and the difluorophosphate are not particularly restricted, and examples thereof include lithium, sodium, potassium, magnesium, calcium, and ammonium represented by $NR^{121}R^{122}R^{123}R^{124}$ (wherein, $R^{121}$ to $R^{124}$ each independently represent a hydrogen atom or an organic group having 1 to 12 carbon atoms). The organic group having 1 to 12 carbon atoms that is represented by $R^{121}$ to $R^{124}$ of the above-described ammonium is not particularly restricted, and examples thereof include alkyl groups optionally substituted with a fluorine atom, cycloalkyl groups optionally substituted with a halogen atom or an alkyl group, aryl groups optionally substituted with a halogen atom or an alkyl group, and nitrogen atom-containing heterocyclic groups optionally having a substituent. Particularly, it is preferred that $R^{121}$ to $R^{124}$ be each independently a hydrogen atom, an alkyl group, a cycloalkyl group, a nitrogen atom-containing heterocyclic group, or the like. Preferred counter cations are lithium, sodium, and potassium, and lithium is particularly preferred.

Examples of the monofluorophosphate and the difluorophosphate include lithium monofluorophosphate, sodium monofluorophosphate, potassium monofluorophosphate, lithium difluorophosphate, sodium difluorophosphate, and potassium difluorophosphate, among which lithium monofluorophosphate and lithium difluorophosphate are preferred, and lithium difluorophosphate is more preferred. These monofluorophosphates and difluorophosphates may be used singly, or two or more thereof may be used in any combination at any ratio.

The amount of one or more fluorophosphates selected from monofluorophosphates and difluorophosphates (a total amount when two or more fluorophosphates are used) is usually not less than 0.001% by mass, preferably not less than 0.01% by mass, more preferably not less than 0.1% by mass, still more preferably not less than 0.2% by mass, particularly preferably not less than 0.3% by mass, but usually 5% by mass or less, preferably 3% by mass or less, more preferably 2% by mass or less, still more preferably 1.5% by mass or less, particularly preferably 1% by mass or less, with respect to a total amount of the nonaqueous electrolyte solution. When the amount of the one or more fluorophosphates is in this range, a prominent effect of improving the initial irreversible capacity is exerted.

The mass ratio between the above-described compound represented by Formula (1) and the monofluorophosphate and the difluorophosphate (a total amount when two or more thereof are used), [compound represented by Formula (1): (monofluorophosphate and difluorophosphate)], is usually 1:100 or higher, preferably 10:100 or higher, more preferably 20:100 or higher, still more preferably 25:100 or higher, but usually 10,000:100 or lower, preferably 500:100 or lower, more preferably 300:100 or lower, still more preferably 100:100 or lower, particularly preferably 75:100 or lower, most preferably 50:100 or lower. When the mass ratio is in this range, the battery characteristics, particularly the durability characteristics can be markedly improved. Although the mechanism of this effect is not clear, it is believed that, by mixing these compounds at the above-described ratio, side reactions of additives on electrodes are minimized.

[1-5. Method of Producing Nonaqueous Electrolyte Solution]

The nonaqueous electrolyte solution can be prepared by dissolving an electrolyte, a specific silane-containing compound (compound represented by Formula (1)) and, as required, the above-described "auxiliary agents" and the like, in the above-described nonaqueous solvent.

In the preparation of the nonaqueous electrolyte solution, raw materials of the nonaqueous electrolyte solution, namely the electrolyte such a lithium salt, the specific silane-containing compound, the nonaqueous solvent, the auxiliary agents and the like, are preferably dehydrated in advance. As for the degree of this dehydration, it is desired that the dehydration be performed until the raw materials have a moisture content of usually 50 ppm by mass or less, preferably 30 ppm by mass or less.

By removing water from the nonaqueous electrolyte solution, for example, electrolysis of water, reaction between water and lithium metal, and hydrolysis of the lithium salt are made less likely to occur. A means for performing the dehydration is not particularly restricted and, for example, a drying agent such as a molecular sieve may be used when a liquid such as a nonaqueous solvent is to be dehydrated. Meanwhile, when a solid such as an electrolyte is to be dehydrated, the solid may be heat-dried at a temperature lower than the temperature at which the solid is decomposed.

[2. Energy Device Using Nonaqueous Electrolyte Solution]

An energy device using a nonaqueous electrolyte solution includes: plural electrodes each capable of occluding or releasing metal ions; and the above-described nonaqueous electrolyte solution. Specific examples of the type of the energy device include primary batteries, secondary batteries, and metal ion capacitors such as lithium ion capacitors. Thereamong, the energy device is preferably a primary battery or a secondary battery, particularly preferably a secondary battery. The nonaqueous electrolyte solution used in the energy device is preferably a so-called gel electrolyte that is pseudo-solidified with a polymer, a filler, or the like. The energy device will now be described.

[2-1. Nonaqueous Electrolyte Secondary Battery]

The nonaqueous electrolyte secondary battery according to one embodiment of the present invention is a nonaqueous electrolyte secondary battery that includes: a positive electrode that contains a positive electrode active material capable of occluding and releasing metal ions; and a negative electrode that contains a negative electrode active material capable of occluding and releasing metal ions, and the nonaqueous electrolyte secondary battery contains a nonaqueous electrolyte solution.

[2-1-1. Battery Configuration]

The nonaqueous electrolyte secondary battery has the same configuration as that of a conventionally known nonaqueous electrolyte secondary battery, except for the nonaqueous electrolyte solution. The nonaqueous electrolyte secondary battery usually has a form in which the positive electrode and the negative electrode are laminated via a porous membrane (separator) impregnated with the nonaqueous electrolyte solution, and these components are housed in a casing (outer package).

[2-1-2. Nonaqueous Electrolyte Solution]

As the nonaqueous electrolyte solution, the above-described nonaqueous electrolyte solution is used. It is noted here that the above-described nonaqueous electrolyte solution can also be blended with other nonaqueous electrolyte solution within a range that does not depart from the gist of the invention according to the present embodiment.

[2-1-3. Negative Electrode]

The negative electrode contains a negative electrode active material on at least a portion of the surface of a current collector.

[2-1-3-1. Negative Electrode Active Material]

The negative electrode active material used in the negative electrode is not particularly restricted as long as it is capable of electrochemically occluding and releasing metal ions. Specific examples of the negative electrode active material include carbonaceous materials, metal compound-based materials, lithium-containing metal composite oxide materials, and mixtures of these materials. Any of these materials may be used singly, or two or more thereof may be used in any combination.

Particularly, it is preferred to use a carbonaceous material, a metal compound-based material, or a mixture of a metal compound-based material and graphite particles, since this provides good cycle characteristics and good safety as well as excellent continuous charging characteristics. Among metal compound-based materials, silicon-containing materials are preferred. Accordingly, the negative electrode active material is particularly preferably a carbonaceous material or a silicon-containing material.

[2-1-3-1-1. Carbonaceous Material]

The carbonaceous material used as the negative electrode active material is not particularly restricted; however, it is preferably one selected from the following (a) to (e) from the standpoint of providing a secondary battery with a good balance of initial irreversible capacity and high-current-density charge-discharge characteristics:

(a) a natural graphite;
(b) a carbonaceous material obtained by heat-treating an artificial carbonaceous substance and an artificial graphitic substance in a temperature range of 400° C. to 3,200° C. at least once;
(c) a carbonaceous material that is composed of at least two carbonaceous substances different in crystallinity and/or has an interface where the carbonaceous substances different in crystallinity are in contact with each other;
(d) a carbonaceous material that is composed of at least two carbonaceous substances different in orientation and/or has an interface where the carbonaceous substances different in orientation are in contact with each other; and
(e) amorphous carbon.

Any of these carbonaceous materials may be used singly, or two or more thereof may be used in any combination at any ratio.

Specific examples of the artificial carbonaceous substance or the artificial graphitic substance in the above-described (b) include:

coal-based coke, petroleum coke, coal-based pitch, petroleum pitch, and oxidation products of these pitches;
needle coke, pitch coke, and carbon materials obtained by partial graphitization of these cokes;
pyrolysis products of organic substances, such as furnace black, acetylene black, and pitch-based carbon fibers;
carbonizable organic substances and carbonization products thereof; and
solution-form carbides obtained by dissolving a carbonizable organic substance in a low-molecular-weight organic solvent, such as benzene, toluene, xylene, quinoline, or n-hexane.

All of the above-described carbonaceous materials (a) to (e) are conventionally known and may be produced by a production method that is well-known to those of ordinary skill in the art, or may be purchased as commercially available products.

Among the above-described carbonaceous materials, a natural graphite is preferred. Any of the above-described carbonaceous materials may be used singly, or two or more thereof may be used in any combination at any ratio.

Examples of the natural graphite include scaly graphite, flake graphite, and graphite particles obtained by performing a treatment, such as spheronization or densification, on any of these graphites as a raw material. Thereamong, spherical or ellipsoidal graphite particles obtained by a spheronization treatment are particularly preferred from the standpoints of the packing property of the particles and the charge-discharge rate characteristics.

The average particle size (d50) of the graphite particles is usually 1 µm to 100 µm.

Further, the carbonaceous material preferably satisfies at least one of the below-described characteristics (1) to (4) relating to physical properties, shape and the like, and more preferably satisfies a plurality of the below-described characteristics (1) to (4) at the same time.

(1) X-Ray Diffraction Parameter

The value of d (interlayer distance) between lattice planes ((002) planes) of the carbonaceous material, which is determined by X-ray diffractometry in accordance with the method of the Japan Society for the Promotion of Science, is usually 0.335 nm to 0.360 nm. Further, the crystallite size (Lc) of the carbonaceous material, which is determined by X-ray diffractometry in accordance with the method of the Japan Society for the Promotion of Science, is usually 1.0 nm or larger.

(2) Volume-Based Average Particle Size

The volume-based average particle size of the carbonaceous material is an average particle size (median diameter) based on volume that is determined by a laser diffraction-scattering method, and it is usually 1 µm to 100 µm.

(3) Raman R Value and Raman Half-Value Width

The Raman R value of the carbonaceous material is a value determined by argon ion laser Raman spectrometry, and it is usually 0.01 to 1.5.

The Raman half-value width of the carbonaceous material at about 1,580 $cm^{-1}$ is not particularly restricted; however, it is usually 10 $cm^{-1}$ or to 100 $cm^{-1}$.

(4) BET Specific Surface Area

The BET specific surface area of the carbonaceous material is a value determined by a BET method, and it is usually 0.1 $m^2 \cdot g^{-1}$ to 100 $m^2 \cdot g^{-1}$.

Two or more carbonaceous materials that are different in character may be contained in the negative electrode active material. The term "character" used herein means at least one selected from the group consisting of the X-ray diffraction parameter, the volume-based average particle size, the Raman R value, the Raman half-value width, and the BET specific surface area.

Examples of preferred modes include one in which the carbonaceous materials have a volume-based particle size distribution that is not bilaterally symmetrical about the median diameter, one in which two or more carbonaceous materials having different Raman R values are contained, and one in which the carbonaceous materials have different X-ray parameters.

[2-1-3-1-2. Metal Compound-Based Material]

The metal compound-based material used as the negative electrode active material is not particularly restricted as long as it is capable of occluding and releasing metal ions such as lithium ions, and a simple metal forming an alloy with lithium or an alloy thereof, or any compound thereof such as an oxide, a carbide, a nitride, a silicide, a sulfide, or a phosphide can be preferably used. Examples of such a metal compound include compounds that contain a metal such as Ag, Al, Ba, Bi, Cu, Ga, Ge, In, Ni, Pb, Sb, Si, Sn, Sr, or Zn. Thereamong, the metal compound-based material is more preferably a material containing a metal or metalloid element of the periodic table Group 13 or 14 (i.e. excluding carbon; a metal and a metalloid are hereinafter collectively referred to as "metal"). From the standpoints of the capacity and the cycle life, the metal compound-based material is preferably, for example, a metal selected from the group consisting of Sb, Si, Sn, Al, As and Zn, or a compound thereof, more preferably a simple metal of silicon (Si), tin (Sn) or lead (Pb) (hereinafter, these three elements may be referred to as "SSP metal elements"), an alloy containing these metal elements, or a compound of these metals (SSP metal elements). Silicon is most preferred and, from the standpoint of increasing the capacity, Si metal (hereinafter, may be referred to as "Si") or an Si metal compound is preferred.

In the present specification, Si and an Si metal compound are collectively referred to as "Si compound". Specific examples of an Si compound include $SiO_x$, $SiN_x$, $SiC_x$, and $SiZ_xO_y$ (wherein, Z=C or N). The Si compound is preferably an Si metal oxide ($SiO_x$) since it has a higher theoretical capacity than graphite, or amorphous Si or nano-sized Si crystals from the standpoint of facilitating the migration of alkali ions such as lithium ions to obtain a high capacity.

This $SiO_x$ is obtained using silicon dioxide ($SiO_2$) and Si as raw materials, and the value of x is usually 0<x<2.

When the metal compound-based material is in the form of particles, from the standpoint of the cycle life, the average particle size (d50) thereof is usually 0.01 µm to 10 µm.

The metal compound-based material may be used singly, or two or more thereof may be used in any combination at any ratio.

[2-1-3-1-3. Mixture of Metal Compound-Based Material and Graphite Particles]

The mixture of a metal compound-based material and graphite particles that is used as the negative electrode active material may be a mixture in which the above-described metal compound-based material and the above-described graphite particles are mixed in a state of mutually independent particles, or may be a composite in which the metal compound-based material exists on the surface or the inside of the graphite particles.

The content ratio of the metal compound-based material with respect to a total amount of the metal compound-based material and the graphite particles is usually 1% by mass to 99% by mass.

[2-1-3-1-4. Lithium-Containing Metal Composite Oxide Material]

The lithium-containing metal composite oxide material used as the negative electrode active material is not particularly restricted as long as it is capable of occluding and releasing lithium ions; however, from the standpoint of the high-current-density charge-discharge characteristics, it is preferably a lithium-containing composite metal oxide material that contains titanium, more preferably a composite oxide of lithium and titanium (hereinafter, may be simply referred to as "lithium-titanium composite oxide"), and a lithium-titanium composite oxide having a spinel structure is particularly preferred since it greatly reduces the output resistance of the secondary battery.

In addition, a lithium-titanium composite oxide in which lithium and/or titanium is substituted with other metal element, for example, at least one element selected from the group consisting of Al, Ga, Cu and Zn, is also preferred.

As the lithium-titanium composite oxide, $Li_{4/3}Ti_{5/3}O_4$, $Li_1Ti_2O_4$ and $Li_{4/5}Ti_{11/5}O_4$ are preferred. Further, as a lithium-titanium composite oxide in which lithium and/or titanium is/are partially substituted with other element, for example, $Li_{4/3}Ti_{4/3}Al_{1/3}O_4$ is preferred.

[2-1-3-2. Constitution, Physical Properties, and Production Method of Negative Electrode]

Known technical constitutions can be employed with regard to the negative electrode containing the above-described active substance material, a method of producing the electrode, and a current collector; however, it is desired that one or more of the following items (I) to (VIII) be satisfied at the same time.

(I) Production of Negative Electrode

For the production of the negative electrode, any known method can be employed as long as it does not markedly impair the effects of the present invention. For example, a binder, a solvent and, as required, a thickening agent, a conductive material, a filler and the like are added to the negative electrode active material to prepare a slurry, and this slurry is subsequently coated and dried onto a current collector, followed by pressing of the resultant to form a negative electrode active material layer, whereby the negative electrode can be formed.

(II) Current Collector

As the current collector on which the negative electrode active material is retained, any known current collector can be used. Examples of the current collector of the negative electrode include metal materials such as aluminum, copper, nickel, stainless steel, and nickel-plated steel, among which copper is particularly preferred because of its processability and cost.

The current collector may be in the form of a mesh as appropriate. When the current collector of the negative electrode has a plate shape, a film shape or the like, the current collector may have any thickness; however, the thickness is usually 1 µm to 1 mm.

(III) Thickness of Current Collector and Negative Electrode Active Material Layer The thickness of the negative electrode (hereinafter, also referred to as "negative electrode plate") is designed in accordance with the current collector to be used and is not particularly restricted; however, the thickness of the negative electrode active material layer, which is determined by subtracting the thickness of the current collector from the thickness of the negative electrode material, is usually 15 µm to 300 µm.

(IV) Electrode Density

The structure of an electrode formed from the negative electrode active material is not particularly restricted, and the density of the negative electrode active material layer existing on the current collector is 1 $g \cdot cm^{-3}$ to 4 $g \cdot cm^{-3}$.

(V) Binder

The binder used for binding the negative electrode active material is not particularly restricted as long as it is a material that is stable against the nonaqueous electrolyte solution and the solvent used in the electrode production.

Specific examples of the binder include: rubbery polymers, such as SBR (styrene-butadiene rubbers), isoprene rubbers, butadiene rubbers, fluororubbers, NBR (acrylonitrile-butadiene rubbers), and ethylene-propylene rubbers; and fluorine-based polymers, such as polyvinylidene fluoride, polytetrafluoroethylene, fluorinated polyvinylidene fluoride, and polytetrafluoroethylene-ethylene copolymers.

Any of these binders may be used singly, or two or more thereof may be used in any combination at any ratio.

The ratio of the binder with respect to 100 parts by mass of the negative electrode active material is usually 0.1 parts by mass to 20 parts by mass.

Particularly, when the slurry, which is a negative electrode-forming material, contains a rubbery polymer represented by SBR as a main component, the ratio of the binder with respect to 100 parts by mass of the negative electrode active material is usually 0.1 parts by mass to 5 parts by mass.

Further, when the slurry contains a fluorine-based polymer represented by polyvinylidene fluoride as a main component, the ratio of the binder with respect to 100 parts by mass of the negative electrode active material is usually 1 part by mass to 15 parts by mass.

(VI) Liquid Medium

The type of a liquid medium used for the preparation of the slurry is not particularly restricted as long as it is a solvent that is capable of dissolving or dispersing the negative electrode active material and the binder as well as the thickening agent and the conductive material used as required, and either an aqueous solvent or an organic solvent may be used.

(VII) Thickening Agent

The thickening agent is usually used for the purpose of adjusting the viscosity of the resulting slurry. The thickening agent is not particularly restricted, and specific examples thereof include carboxymethyl cellulose, methyl cellulose, hydroxymethyl cellulose, ethyl cellulose, polyvinyl alcohol, oxidized starch, phosphorylated starch, casein, and salts thereof. Any of these thickening agents may be used singly, or two or more thereof may be used in any combination at any ratio.

When a thickening agent is used, the ratio thereof with respect to 100 parts by mass of the negative electrode active material is usually 0.1 parts by mass to 5 parts by mass.

(VIII) Surface Coating of Negative Electrode Plate

The above-described negative electrode plate may be used in the form that a substance (surface adhering substance) having a composition different from that of the negative electrode active material is adhered to the surface. Examples of the surface adhering substance include oxides such as aluminum oxide, sulfates such as lithium sulfate, and carbonates such as lithium carbonate.

[2-1-4. Positive Electrode]

The positive electrode used in the nonaqueous electrolyte secondary battery will now be described.

The positive electrode contains a positive electrode active material on at least a portion of the surface of a current collector.

[2-1-4-1. Positive Electrode Active Material]

First, the positive electrode active material used in the positive electrode will be described.

(1) Composition

The positive electrode active material is not particularly restricted as long as it is capable of electrochemically occluding and releasing metal ions; however, the positive electrode active material is preferably, for example, a substance that is capable of electrochemically occluding and releasing lithium ions and contains lithium and at least one transition metal (lithium-transition metal compound). Specific examples of the lithium-transition metal compound include lithium-transition metal composite oxides, lithium-containing transition metal phosphate compounds, lithium-containing transition metal silicate compounds, and lithium-containing transition metal borate compounds. Thereamong, lithium-transition metal composite oxides are preferred.

As the transition metals of the lithium-transition metal composite oxides, for example, V, Ti, Cr, Mn, Fe, Co, Ni, and Cu are preferred. Specific examples of the lithium-transition metal composite oxides include: lithium-cobalt composite oxides, such as $LiCoO_2$; lithium-nickel composite oxides, such as $LiNiO_2$; lithium-manganese composite oxides, such as $LiMnO_2$, $LiMn_2O_4$, and $Li_2MnO_4$; and these lithium-transition metal composite oxides in which some of the transition metal atoms contained as main components are substituted with other metal such as Al, Ti, V, Cr, Mn, Fe, Co, Li, Ni, Cu, Zn, Mg, Ga, Zr, Si, Nb, Mo, Sn, or W.

Specific examples of substituted lithium-transition metal composite oxides include $LiNi_{0.5}Mn_{0.5}O_2$, $LiNi_{0.85}Co_{0.10}Al_{0.05}O_2$, $LiNi_{0.33}Co_{0.33}Mn_{0.33}O_2$, $LiMn_{1.8}Al_{0.2}O_4$, $Li_{1.1}Mn_{1.9}Al_{0.1}O_4$, and $LiMn_{1.5}Ni_{0.5}O_4$.

Thereamong, composite oxides containing lithium, nickel and cobalt are more preferred. This is because a composite oxide containing cobalt and nickel can increase the capacity when the secondary battery is used at the same potential.

On the other hand, cobalt is not abundant in terms of resource amount and is thus an expensive metal, and a large amount of active material is used in large-sized batteries for automobile applications and the like where a large capacity is required; therefore, from the cost standpoint, it is also desirable to use manganese, which is a less expensive transition metal, as a main component. In other words, lithium-nickel-cobalt-manganese composite oxides are particularly preferred.

In view of the stability as a compound and the acquisition cost based on the ease of production, lithium-manganese composite oxides having a spinel structure are also preferred. In other words, among the above-described specific examples, for example, $LiMn_2O_4$, $LiMn_{1.8}Al_{0.2}O_4$, $Li_{1.1}Mn_{1.9}Al_{0.1}O_4$, and $LiMn_{1.5}Ni_{0.5}O_4$ can also be mentioned as preferred specific examples.

As the transition metals of the above-described lithium-containing transition metal phosphate compounds, for example, V, Ti, Cr, Mn, Fe, Co, Ni, and Cu are preferred, and specific examples of the lithium-containing transition metal phosphate compounds include: iron phosphates, such as $LiFePO_4$, $Li_3Fe_2(PO_4)_3$, and $LiFeP_2O_7$; cobalt phosphates, such as $LiCoPO_4$; manganese phosphates, such as $LiMnPO_4$; and these lithium-containing transition metal phosphate compounds in which some of the transition metal atoms contained as main components are substituted with other metal such as Al, Ti, V, Cr, Mn, Fe, Co, Li, Ni, Cu, Zn, Mg, Ga, Zr, Si, Nb, Mo, Sn, or W. Thereamong, a lithium iron phosphate compound is preferred since iron is not only abundant in terms of resource amount and thus an extremely cheap metal but also hardly hazardous. In other words, among the above-described specific examples, $LiFePO_4$ can be mentioned as a more preferred specific example.

As the transition metals of the above-described lithium-containing transition metal silicate compounds, for example, V, Ti, Cr, Mn, Fe, Co, Ni, and Cu are preferred, and specific examples of the lithium-containing transition metal silicate compounds include: iron silicates, such as $Li_2FeSiO_4$; cobalt silicates, such as $Li_2CoSiO_4$; and these lithium-containing transition metal silicate compounds in which some of the transition metal atoms contained as main components are substituted with other metal such as Al, Ti, V, Cr, Mn, Fe, Co, Li, Ni, Cu, Zn, Mg, Ga, Zr, Si, Nb, Mo, Sn, or W.

As the transition metals of the above-described lithium-containing transition metal borate compounds, for example, V, Ti, Cr, Mn, Fe, Co, Ni, and Cu are preferred, and specific examples of the borate compounds include: iron borates, such as $LiFeBO_3$; cobalt borates, such as $LiCoBO_3$; and these lithium-containing transition metal borate compounds in which some of the transition metal atoms contained as main components are substituted with other metal such as Al, Ti, V, Cr, Mn, Fe, Co, Li, Ni, Cu, Zn, Mg, Ga, Zr, Si, Nb, Mo, Sn, or W.

In the positive electrode used in the nonaqueous electrolyte secondary battery, it is preferred to use a lithium-transition metal composite oxide represented by the following composition formula (3):

$$Li_{a101}Ni_{b101}Co_{c101}M_{d101}O_2 \qquad (3)$$

(wherein, a101, b101, c101, and d101 represent numerical values satisfying $0.90 \leq a101 \leq 1.10$, $0.40 \leq b101 \leq 0.98$, $0.01 \leq c101 < 0.50$ and $0.01 \leq d101 < 0.50$, respectively, and satisfy $b101+c101+d101=1$; and M represents at least one element selected from the group consisting of Mn, Al, Mg, Zr, Fe, Ti, and Er).

It is preferred that b101 be 0.50 to 0.98.

Preferred specific examples of the lithium-transition metal composite oxide represented by the composition formula (3) include $LiNi_{0.85}Co_{0.10}Al_{0.05}O_2$, $LiNi_{0.80}Co_{0.15}Al_{0.05}O_2$, $LiNi_{0.4}Co_{0.4}Mn_{0.2}O_2$, $LiNi_{0.5}Co_{0.2}Mn_{0.3}O_2$, $Li_{1.05}Ni_{0.50}Co_{0.20}Mn_{0.30}O_2$, $Li_{1.05}Ni_{0.50}Mn_{0.29}Co_{0.21}O_2$, $LiNi_{0.6}Co_{0.2}Mn_{0.2}O_2$, and $LiNi_{0.8}Co_{0.1}Mn_{0.1}O_2$.

As the lithium-transition metal composite oxide represented by the composition formula (3), one represented by the following composition formula (4) is preferred. The reason for this is because it allows the compound represented by Formula (1) to react with alkaline impurities in a preferred manner, and the effect of inhibiting gas generation during high-temperature storage is thereby further improved.

$$Li_{a102}Ni_{b102}Co_{c102}M_{d102}O_2 \quad (4)$$

(wherein, a102, b102, c102, and d102 represent numerical values satisfying $0.90 \leq a102 \leq 1.10$, $0.50 \leq b102 \leq 0.98$, $0.01 \leq c102 < 0.40$ and $0.01 \leq d102 < 0.40$, respectively, and satisfy $b102+c102+d102=1$; and M represents at least one element selected from the group consisting of Mn, Al, Mg, Zr, Fe, Ti, and Er).

Preferred specific examples of the lithium-transition metal composite oxide represented by the composition formula (4) include $LiNi_{0.85}Co_{0.10}Al_{0.05}O_2$, $LiNi_{0.80}Co_{0.15}Al_{0.05}O_2$, $LiNi_{0.5}Co_{0.2}Mn_{0.3}O_2$, $Li_{1.05}Ni_{0.50}Co_{0.20}Mn_{0.30}O_2$, $Li_{1.05}Ni_{0.50}Mn_{0.29}Co_{0.21}O_2$, $LiNi_{0.6}Co_{0.2}Mn_{0.2}O_2$, and $LiNi_{0.8}Co_{0.1}Mn_{0.1}O_2$.

As the lithium-transition metal composite oxide represented by the composition formula (3), one represented by the following composition formula (5) is also preferred. The reason for this is because it allows the compound represented by Formula (1) to react with alkaline impurities in a preferred manner, and the effect of inhibiting gas generation during high-temperature storage is thereby further improved.

$$Li_{a103}Ni_{b103}Co_{c103}M_{d103}O_2 \quad (5)$$

(wherein, a103, b103, c103, and d103 represent numerical values satisfying $0.90 \leq a103 \leq 1.10$, $0.50 \leq b103 \leq 0.90$, $0.05 \leq c103 \leq 0.30$ and $0.05 \leq d103 \leq 0.30$, respectively, and satisfy $b103+c103+d103=1$; and M represents at least one element selected from the group consisting of Mn, Al, Mg, Zr, Fe, Ti, and Er).

As the lithium-transition metal composite oxide represented by the composition formula (3), one represented by the following composition formula (6) is also preferred. The reason for this is because it allows the compound represented by Formula (1) to react with alkaline impurities in a preferred manner, and the effect of inhibiting gas generation during high-temperature storage is thereby further improved.

$$Li_{a104}Ni_{b104}Co_{c104}M_{d104}O_2 \quad (6)$$

(wherein, a104, b104, c104, and d104 represent numerical values satisfying $0.90 \leq a104 \leq 1.10$, $0.50 \leq b104 \leq 0.80$, $0.10 \leq c104 \leq 0.30$ and $0.10 \leq d104 \leq 0.30$, respectively, and satisfy $b104+c104+d104=1$; and M represents at least one element selected from the group consisting of Mn, Al, Mg, Zr, Fe, Ti, and Er).

As the lithium-transition metal composite oxide represented by the composition formula (3), one represented by the following composition formula (7) is particularly preferred. The reason for this is because it allows the compound represented by Formula (1) to react with alkaline impurities in a preferred manner, and the effect of inhibiting gas generation during high-temperature storage is thereby further improved.

$$Li_{a105}Ni_{b105}Co_{c105}M_{d105}O_2 \quad (7)$$

(wherein, a105, b105, c105, and d105 represent numerical values satisfying $0.90 \leq a105 \leq 1.10$, $0.55 \leq b105 \leq 0.98$, $0.01 \leq c105 < 0.30$ and $0.01 \leq d105 < 0.30$, respectively, and satisfy $b105+c105+d105=1$; and M represents at least one element selected from the group consisting of Mn, Al, Mg, Zr, Fe, Ti, and Er).

Preferred specific examples of the lithium-transition metal composite oxide represented by the composition formula (7) include $LiNi_{0.85}Co_{0.10}Al_{0.05}O_2$, $LiNi_{0.80}Co_{0.15}Al_{0.05}O_2$, $LiNi_{0.6}Co_{0.2}Mn_{0.2}O_2$, and $LiNi_{0.8}Co_{0.1}Mn_{0.1}O_2$.

In the above-described composition formulae (3) to (7), M preferably contains Mn or Al, more preferably contains Mn, and M is still more preferably Mn or Al, particularly preferably Mn. The reason for this is because the structural stability of the lithium-transition metal composite oxide is thereby improved, so that structural deterioration during repeated charging and discharging is inhibited.

Any of the above-described positive electrode active materials may be used singly, or two or more thereof may be used as a mixture. Further, at least one of the above-described positive electrode active materials and other positive electrode active material may be used as a mixture as well. Examples of the other positive electrode active material include transition metal oxides that are not mentioned above, transition metal sulfides, transition metal phosphate compounds, transition metal silicate compounds, and transition metal borate compounds.

The positive electrode active material used in combination with a lithium-transition metal composite oxide is preferably the above-described lithium-manganese composite oxide having a spinel structure, or a lithium-containing transition metal phosphate compound having an olivine structure.

As the transition metal of the lithium-containing transition metal phosphate compound, any of the above-described transition metals can be used. A preferred mode thereof is also the same.

(Surface Coating)

The positive electrode active material may be used in the form that a substance (surface adhering substance) having a composition different from that of the positive electrode active material is adhered to the surface. Examples of the surface adhering substance include oxides such as aluminum oxide, sulfates such as lithium sulfate, and carbonates such as lithium carbonate.

These surface adhering substances can be adhered to the surface of the positive electrode active material by, for example, a method in which each surface adhering substance is dissolved or suspended in a solvent and the resulting solution or suspension is added to and impregnated into the positive electrode active material, followed by drying.

The amount of a surface adhering substance is preferably not less than 1 μmol/g or not less than 10 μmol/g, but usually 1 mmol/g or less, with respect to the amount of the positive electrode active material.

In the present specification, a positive electrode active material onto the surface of which the above-described surface adhering substance is adhered is also referred to as "positive electrode active material".

[2-1-4-2. Constitution and Production Method of Positive Electrode]

The constitution of the positive electrode used and a method of producing the positive electrode will now be described.

(Method of Producing Positive Electrode)

The constitution of the positive electrode used and a method of producing the positive electrode will now be described. The production of the positive electrode using the positive electrode active material can be carried out by any known method. The positive electrode can be obtained by, for example, a coating method in which a positive electrode active material layer is formed on a current collector by dry-mixing the positive electrode active material, a conductive material and a binder with, as required, a thickening agent and the like to form a sheet and subsequently press-bonding this sheet onto a positive electrode current collector, or by dissolving or dispersing these materials in a liquid medium to prepare a slurry and subsequently applying and drying this slurry onto a positive electrode current collector. Alternatively, for example, the positive electrode active material may be roll-molded into a sheet electrode, or compression-molded into a pellet electrode.

(Content of Active Material)

The content of the positive electrode active material in the positive electrode active material layer is usually 60% by mass to 99.9% by mass.

(Conductive Material)

As the conductive material, any known conductive material can be used. Specific examples thereof include: metal materials, such as copper and nickel; and carbonaceous materials, for example, graphites such as natural graphites and artificial graphites, carbon blacks such as acetylene black, and amorphous carbon such as needle coke. Any of these conductive materials may be used singly, or two or more thereof may be used in any combination at any ratio. The content of the conductive material in the positive electrode active material layer is usually 0.01% by mass to 50% by mass.

(Binder)

The binder used in the production of the positive electrode active material layer is not particularly restricted as long as it is a material that is stable against the nonaqueous electrolyte solution and the solvent used in the electrode production.

When the positive electrode active material layer is formed by a coating method, the binder is not particular restricted as long as it is a material that can be dissolved or dispersed in a liquid medium used for the preparation of a slurry and, from the standpoints of weather resistance, chemical resistance, heat resistance, flame retardancy and the like, specific examples of the binder include: fluorine-based polymers, such as polyvinyl fluoride, polyvinylidene fluoride (PVdF), polytetrafluoroethylene, and tetrafluoroethylene-ethylene copolymers; and CN group-containing polymers, such as polyacrylonitrile and polyvinylidene cyanide.

Further, for example, a mixture, a modification product, a derivative, a random copolymer, an alternating copolymer, a graft copolymer, or a block copolymer of the above-described polymers can be used as well. Any of these binders may be used singly, or two or more thereof may be used in any combination at any ratio.

When a resin is used as the binder, the weight-average molecular weight of the resin may be set arbitrarily as long as the effects of the present invention are not markedly impaired; however, it is usually 10,000 to 3,000,000. When the molecular weight is in this range, the strength of the electrode is improved, so that the formation of the electrode can be carried out in a preferred manner.

The content of the binder in the positive electrode active material layer is usually 0.1% by mass to 80% by mass.

(Liquid Medium)

The type of the liquid medium used for the preparation of a slurry for forming the positive electrode active material layer is not particularly restricted as long as it is a solvent that is capable of dissolving or dispersing the positive electrode active material, the conductive material and the binder as well as the thickening agent used as required, and either an aqueous solvent or an organic solvent may be used. Examples of the organic solvent include amides such as N-methylpyrrolidone (NMP).

The liquid medium may be used singly, or two or more thereof may be used in any combination at any ratio.

(Density)

The positive electrode active material layer obtained by applying and drying the above-described slurry onto a current collector is preferably consolidated by means of hand pressing, roller pressing or the like so as to increase the packing density of the positive electrode active material. The density of the positive electrode active material layer is preferably 1 g·cm$^{-3}$ or higher, more preferably 1.5 g·cm$^{-3}$ or higher, still more preferably 2 g·cm$^{-3}$ or higher, especially preferably 3.0 g·cm$^{-3}$ or higher, particularly preferably 3.3 g·cm$^{-3}$ or higher, but preferably 4 g·cm$^{-3}$ or lower, more preferably 3.8 g·cm$^{-3}$ or lower, particularly preferably 3.5 g·cm$^{-3}$ or lower.

When the density of the positive electrode active material layer is in this range, the permeability of the nonaqueous electrolyte solution to the vicinity of an interface between the current collector and the active material is not reduced, so that the secondary battery has good charge-discharge characteristics particularly at a high current density. In addition, neither a reduction in the conductivity between active materials nor an increase in the battery resistance is likely to occur.

(Current Collector)

The material of the positive electrode current collector is not particularly restricted, and any known material can be used. Specific examples thereof include metal materials, such as aluminum, stainless steel, nickel-plated steel, titanium, and tantalum. Thereamong, aluminum is preferred.

When the current collector is a metal material, the current collector may have any shape of, for example, a metal foil, a metal cylinder, a metal coil, a metal sheet, a metal thin film, an expanded metal, a punched metal, and a foamed metal and, when the current collector is a carbonaceous material, examples thereof include a carbon sheet, a carbon thin film, and a carbon cylinder. Thereamong, the current collector is preferably a metal foil or a metal thin film. The current collector may be in the form of a mesh as appropriate. When the positive electrode current collector has a shape of a sheet, a film or the like, from the standpoints of the strength and the ease of handling of the current collector, the thickness of the current collector is usually 1 μm to 1 mm.

(Thickness of Positive Electrode Plate)

The thickness of the positive electrode (hereinafter, also referred to as "positive electrode plate") is not particularly restricted; however, from the standpoint of attaining a high capacity and a high output as well as excellent rate characteristics, the thickness of the positive electrode active material layer, which is determined by subtracting the thickness of the current collector from the thickness of the positive electrode plate, is usually 10 µm to 500 µm on one side of the current collector.

(Surface Coating of Positive Electrode Plate)

The above-described positive electrode plate may be used in the form that a substance having a composition different from that of the positive electrode plate is adhered to the surface and, as such a substance, the same substance as the surface adhering substance that may be adhered to the surface of the positive electrode active material is used.

[2-1-5. Separator]

In the nonaqueous electrolyte secondary battery, a separator is usually arranged between the positive electrode and the negative electrode for the purpose of inhibiting a short circuit. In this case, the separator is usually impregnated with a nonaqueous electrolyte solution.

The material of the separator is not particularly restricted as long as it is a material stable against the nonaqueous electrolyte solution, and preferred examples thereof include: resins, for example, polyolefins such as polyethylene and polypropylene; oxides, such as alumina and silicon dioxide; nitrides, such as aluminum nitride and silicon nitride; sulfates, such as barium sulfate and calcium sulfate; and inorganic materials, such as glass filters composed of glass fibers. The material of the separator is more preferably a polyolefin or a glass filter, still more preferably a polyolefin. Any of these materials may be used singly, or two or more thereof may be used in any combination at any ratio. The above-described materials may be laminated as well.

Further, in cases where a porous material such as a porous sheet or a nonwoven fabric is used as the separator, the porosity of the separator may be set arbitrarily; however, it is usually 20% to 90%.

The form of the separator is not particularly restricted; however, a nonwoven fabric, a woven fabric, or a thin film such as a microporous film is preferably used. As a thin-film separator, one having an average pore size of 0.01 to 1 µm and a thickness of 1 to 50 µm is preferably used. Aside from such an independent thin-film separator, a separator obtained by forming a composite porous layer that contains particles of an inorganic material on the surface layer of the positive electrode and/or that of the negative electrode using a resin binder may be used as well. As the separator, a microporous film and a nonwoven fabric are preferred since they have excellent liquid retainability.

(Air Permeability)

The air permeability of the separator in the nonaqueous electrolyte secondary battery can be grasped in terms of Gurley value. The Gurley value indicates the difficulty of air permeation through a film in the thickness direction, and is represented by the number of seconds required for 100 ml of air to pass through the film. The Gurley value of the separator may be set arbitrarily; however, it is usually 10 to 1,000 sec/100 ml.

[2-1-6. Battery Design]

(Electrode Group)

An electrode group may have either a layered structure in which the above-described positive electrode plate and negative electrode plate are layered with the above-described separator being interposed therebetween, or a wound structure in which the above-described positive electrode plate and negative electrode plate are spirally wound with the above-described separator being interposed therebetween. The volume ratio of the electrode group with respect to the internal volume of the battery (this volume ratio is hereinafter referred to as "electrode group occupancy") is usually 40% to 90%.

(Protective Element)

As a protective element, for example, a PTC (Positive Temperature Coefficient) thermistor or thermal fuse whose resistance increases with heat generation caused by excessive current flow or the like, or a valve (current cutoff valve) that blocks an electric current flowing into a circuit in response to a rapid increase in the battery internal pressure or internal temperature in the event of abnormal heat generation can be used. The protective element is preferably selected from those that are not activated during normal use at a high current, and it is more preferred to design the battery such that neither abnormal heat generation nor thermal runaway occurs even without a protective element.

(Outer Package)

The nonaqueous electrolyte secondary battery is usually constructed by housing the above-described nonaqueous electrolyte solution, negative electrode, positive electrode, separator and the like in an outer package (outer casing). This outer package is not restricted, and any known outer package can be employed as long as it does not markedly impair the effects of the present invention.

The material of the outer casing is not particularly restricted as long as it is a substance that is stable against the nonaqueous electrolyte solution; however, from the standpoint of weight reduction, a metal such as aluminum or an aluminum alloy, or a laminated film is preferably used.

Examples of an outer casing using any of the above-described metals include those having a hermetically sealed structure obtained by welding metal pieces together by laser welding, resistance welding or ultrasonic welding, and those having a caulked structure obtained using the above-described metals via a resin gasket.

(Shape)

Further, the shape of the outer casing may be selected arbitrarily, and the outer casing may have any of, for example, a cylindrical shape, a prismatic shape, a laminated shape, a coin shape, and a large-sized shape.

[2-2. Nonaqueous Electrolyte Primary Battery]

A material capable of occluding metal ions is used as a positive electrode, while a material capable of releasing metal ions is used as a negative electrode. As the positive electrode material, a fluorinated graphite or a transition metal oxide such as manganese dioxide is preferred. As the negative electrode material, a simple metal such as zinc or lithium is preferred. As a nonaqueous electrolyte solution, the above-described nonaqueous electrolyte solution is used.

[2-3. Metal Ion Capacitor]

A material capable of forming an electric double layer is used as a positive electrode, while a material capable of occluding and releasing metal ions is used as a negative electrode. As the positive electrode material, activated carbon is preferred. Further, as the negative electrode material, a carbonaceous material is preferred. As a nonaqueous electrolyte solution, the above-described nonaqueous electrolyte solution is used.

[2-4. Electric Double Layer Capacitor]

A material capable of forming an electric double layer is used as electrodes. As the electrode material, activated carbon is preferred. As a nonaqueous electrolyte solution, the above-described nonaqueous electrolyte solution is used.

EXAMPLES

The present invention will now be described more concretely by way of Examples and Comparative Examples; however, the present invention is not restricted to the below-described Examples within the gist of the present invention.

Compounds used in Examples and Comparative Examples are shown below.

compound (1-1)

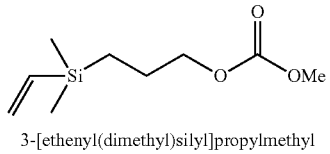

3-[ethenyl(dimethyl)silyl]propylmethyl carbonate compound (1-2)

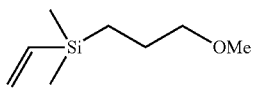

Dimethyl(3-methoxypropyl)vinylsilane compound (1-3)

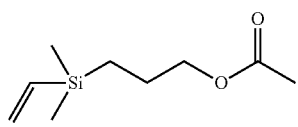

3-[ethenyl(dimethyl)silyl]propyl acetate compound (1-4)

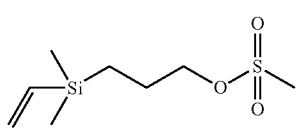

3-[ethenyl(dimethyl)silyl]propyl methanesulfonate

The structures of the compounds used in Comparative Examples are shown below.

compound (2-1)

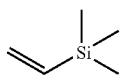

Trimethylvinylsilane compound (2-2)

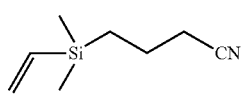

(3-cyanpropyl)dimethylvinylsilane compound (2-3)

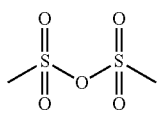

Methanesulfonic acid anhydride compound (2-4)

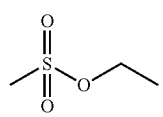

Ethyl methanesulfonate compound (2-5)

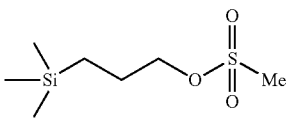

3-(trimethylsilyl)propyl methanesulfonate

Examples 1-1 to 1-6 and Comparative Examples 1-1 to 1-6

Example 1-1

[Preparation of Nonaqueous Electrolyte Solution]

Under a dry argon atmosphere, an electrolyte $LiPF_6$ was dissolved at a ratio of 1.2 mol/L (14.7% by mass in terms of the concentration in the resulting nonaqueous electrolyte solution) in a mixed solvent of ethylene carbonate (hereinafter, also referred to as "EC"), ethyl methyl carbonate (hereinafter, also referred to as "EMC") and dimethyl carbonate (hereinafter, also referred to as "DMC") (mixed volume ratio EC:EMC:DMC=2:4:4). Subsequently, 1.0% by mass of lithium difluorophosphate and 1.0% by mass of vinylene carbonate (hereinafter, also referred to as "VC") were further dissolved as additives to prepare a basic electrolyte solution. In addition, a nonaqueous electrolyte solution of Example 1-1 was prepared by adding 0.5% by mass of the compound (1-1) as an additive to the thus obtained basic electrolyte solution. It is noted here that the content of each additive is an amount contained in a total of 100% by mass of the nonaqueous electrolyte solution.

[Production of Positive Electrode]

A slurry was prepared by mixing 94 parts by mass of lithium-nickel-cobalt-manganese composite oxide ($LiNi_{0.6}Co_{0.2}Mn_{0.2}O_2$) as a positive electrode active material, 3 parts by mass of acetylene black as a conductive material, and 3 parts by mass of polyvinylidene fluoride (PVdF) as a binder in an N-methylpyrrolidone solvent using a disperser. This slurry was uniformly applied and dried onto one side of a 15 μm-thick aluminum foil, which was subsequently pressed such that the resulting positive electrode active material layer had a density of 3.3 g·cm$^{-3}$, whereby a positive electrode was produced.

[Production of Negative Electrode]

Natural graphite powder as a negative electrode active material, an aqueous dispersion of sodium carboxymethyl cellulose (concentration of sodium carboxymethyl cellulose=1% by mass) as a thickening agent, and an aqueous dispersion of styrene-butadiene rubber (concentration of styrene-butadiene rubber=50% by mass) as a binder were added and mixed using a disperser to prepare a slurry. This slurry was uniformly applied and dried onto one side of a 10 μm-thick copper foil, which was subsequently pressed to produce a negative electrode. It is noted here that this production was carried out such that the negative electrode after being dried had a mass ratio (natural graphite:sodium carboxymethyl cellulose:styrene-butadiene rubber) of 98:1:1.

[Production of Lithium Secondary Battery]

A battery element was prepared by laminating the above-obtained positive electrode and negative electrode along with a polypropylene separator in the order of the negative electrode, the separator, the positive electrode, the separator, and the negative electrode. This battery element was inserted into a pouch made of a laminated film obtained by coating both sides of an aluminum sheet (thickness: 40 μm) with a resin layer, such that the terminals of the positive and negative electrodes protruded out of the pouch. Thereafter, the above-prepared nonaqueous electrolyte solution was injected into the pouch, and the pouch was subsequently vacuum-sealed, whereby a sheet-form lithium secondary battery was produced.

[Initial Charging and Discharging]

The lithium secondary battery in a state of being pressed between glass plates was charged at 25° C. for 10 hours with a constant current equivalent to 0.05 C, and subsequently discharged to 2.8 V at a constant current of 0.2 C. Further, the lithium secondary battery was subjected to constant current-constant voltage charging (hereinafter, also referred to as CC-CV charging") up to 4.1 V with a current equivalent to 0.2 C (0.05 C cut-off), and left to stand at 60° C. for 24 hours. The battery was thoroughly cooled and then discharged to 2.8 V at a constant current of 0.2 C. Thereafter, the battery was subjected to CC-CV charging (0.05 C cut-off) up to 4.3 V at 0.2 C and again discharged to 2.8 V at 0.2 C, after which the battery was further subjected to CC-CV charging (0.05 C cut-off) up to 3.72 V at 0.2 C, whereby the initial battery was stabilized.

It is noted here that "1 C" means a current value at which a reference capacity of a battery is discharged in one hour and, for example, 0.2 C is ⅕ of the current value. The same applies below.

[Initial Discharge Resistance Evaluation Test]

The lithium secondary battery subjected to the initial charging and discharging was discharged for 10 seconds at −20° C. and a current of 0.1 C. From a difference in the battery voltage between before and immediately after this 10-second discharge, the resistance was calculated in accordance with Ohm's law [R (resistance)=V (voltage)/I (current)], and the thus obtained value was defined as the initial discharge resistance.

[High-Temperature Storage Durability Test (Battery Swelling)]

After the initial discharge resistance evaluation test, the lithium secondary battery was subjected to CC-CV charging (0.05 C cut-off) at 25° C. up to 4.3 V with 0.2 C, and subsequently immersed in an ethanol bath to determine the pre-storage battery volume from the buoyancy (Archimedes' principle). Then, "an operation of subjecting the lithium secondary battery to high-temperature storage at 60° C. for 14 days, discharging to 2.8 V at a constant current of 0.2 C and a temperature of 25° C., and again CC-CV charging (0.05 C cut-off) up to 4.3 V with a constant current of 0.2 C at 25° C." was performed for a total of two times. The lithium secondary battery was further subjected to high-temperature storage at 60° C. for 14 days and subsequently thoroughly cooled, after which the battery was immersed in an ethanol bath to measure the volume, and the amount of battery swelling was determined from a volume change before and after this high-temperature storage durability test.

For the above-produced lithium secondary battery, the above-described initial charge-discharge test, initial discharge resistance evaluation test, and high-temperature storage durability test were conducted. The evaluation results are shown in Table 1 in terms of relative values, taking the values of the below-described Comparative Example 1-1 as 100.0%. The same applies to Examples 1-2 to 1-6 and Comparative Examples 1-2 to 1-6.

Example 1-2

A lithium secondary battery was produced and subjected to the above-described evaluations in the same manner as in Example 1-1, except that 1.0% by mass of the compound (1-1) was used in place of 0.5% by mass of the compound (1-1) in the electrolyte solution of Example 1-1.

Example 1-3

A lithium secondary battery was produced and subjected to the above-described evaluations in the same manner as in Example 1-1, except that 2.0% by mass of the compound (1-1) was used in place of 0.5% by mass of the compound (1-1) in the electrolyte solution of Example 1-1.

Example 1-4

A lithium secondary battery was produced and subjected to the above-described evaluations in the same manner as in Example 1-2, except that 1.0% by mass of the compound (1-2) was used in place of 1.0% by mass of the compound (1-1) in the electrolyte solution of Example 1-2.

Example 1-5

A lithium secondary battery was produced and subjected to the above-described evaluations in the same manner as in Example 1-2, except that 1.0% by mass of the compound (1-3) was used in place of 1.0% by mass of the compound (1-1) in the electrolyte solution of Example 1-2.

Example 1-6

A lithium secondary battery was produced and subjected to the above-described evaluations in the same manner as in Example 1-2, except that 1.0% by mass of the compound (1-4) was used in place of 1.0% by mass of the compound (1-1) in the electrolyte solution of Example 1-2.

Comparative Example 1-1

A lithium secondary battery was produced and subjected to the above-described evaluations in the same manner as in Example 1-1, except that the basic electrolyte solution not containing the compound (1-1) was used in place of the electrolyte solution of Example 1-1.

Comparative Example 1-2

A lithium secondary battery was produced and subjected to the above-described evaluations in the same manner as in Example 1-2, except that 1.0% by mass of the compound (2-1) was used in place of 1.0% by mass of the compound (1-1) in the electrolyte solution of Example 1-2.

Comparative Example 1-3

A lithium secondary battery was produced and subjected to the above-described evaluations in the same manner as in Example 1-2, except that 1.0% by mass of the compound (2-2) was used in place of 1.0% by mass of the compound (1-1) in the electrolyte solution of Example 1-2.

Comparative Example 1-4

A lithium secondary battery was produced and subjected to the above-described evaluations in the same manner as in Example 1-2, except that 1.0% by mass of the compound (2-3) was used in place of 1.0% by mass of the compound (1-1) in the electrolyte solution of Example 1-2.

Comparative Example 1-5

A lithium secondary battery was produced and subjected to the above-described evaluations in the same manner as in Example 1-2, except that 1.0% by mass of the compound (2-4) was used in place of 1.0% by mass of the compound (1-1) in the electrolyte solution of Example 1-2.

Comparative Example 1-6

A lithium secondary battery was produced and subjected to the above-described evaluations in the same manner as in Example 1-2, except that 0.45% by mass of the compound (2-1) and 0.56% by mass of the compound (2-4) were used in place of 1.0% by mass of the compound (1-1) in the electrolyte solution of Example 1-2.

TABLE 1

|  | additives | initial discharge resistance (%) | battery swelling (%) |
|---|---|---|---|
| Example 1-1 | compound (1-1) 0.5% by mass | 77.3 | 93.3 |
| Example 1-2 | compound (1-1) 1.0% by mass | 79.9 | 88.7 |
| Example 1-3 | compound (1-1) 2.0% by mass | 82.9 | 82.6 |
| Example 1-4 | compound (1-2) 1.0% by mass | 94.3 | 84.3 |
| Example 1-5 | compound (1-3) 1.0% by mass | 99.9 | 79.5 |
| Example 1-6 | compound (1-4) 1.0% by mass | 90.2 | 75.3 |
| Comparative Example 1-1 | none | 100.0 | 100.0 |
| Comparative Example 1-2 | compound (2-1) 1.0% by mass | 112.6 | 90.8 |
| Comparative Example 1-3 | compound (2-2) 1.0% by mass | 129.2 | 73.2 |
| Comparative Example 1-4 | compound (2-3) 1.0% by mass | 103.7 | 85.9 |
| Comparative Example 1-5 | compound (2-4) 1.0% by mass | 119.8 | 82.0 |
| Comparative Example 1-6 | compound (2-1) 0.45% by mass + compound (2-4) 0.56% by mass | 110.6 | 89.4 |

From Table 1, it is seen that the use of the electrolyte solution of any of Examples 1-1 to 1-6 can inhibit battery swelling without causing an increase in the initial discharge resistance as compared to a case where the electrolyte solution does not contain the compound represented by Formula (1) (Comparative Example 1-1). On the other hand, it is seen that the electrolyte solution of Comparative Example 1-2 not only increases the initial discharge resistance but also has a weak effect of inhibiting battery swelling. It was found that the use of the electrolyte solution of any of Comparative Examples 1-3 to 1-6 caused an increase in the initial discharge resistance, although it inhibited battery swelling. Therefore, it is apparent that a lithium secondary battery using the nonaqueous electrolyte solution according to the present invention has superior properties.

Examples 2-1 and 2-2, and Comparative Examples 2-1 and 2-2

Example 2-1

A lithium secondary battery was produced and subjected to the above-described evaluations in the same manner as in Example 1-6, except that an electrolyte solution which did not contain lithium difluorophosphate and contained the compound (1-4) in an amount of 0.5% by mass instead of 1.0% by mass was used in place of the electrolyte solution of Example 1-6.

Example 2-2

A lithium secondary battery was produced and subjected to the above-described evaluations in the same manner as in Example 2-1, except that 0.5% by mass of lithium difluorophosphate was used in the electrolyte solution of Example 2-1.

Comparative Example 2-1

A lithium secondary battery was produced and subjected to the above-described evaluations in the same manner as in Comparative Example 1-1, except that an electrolyte solution not containing lithium difluorophosphate was used in place of the electrolyte solution of Comparative Example 1-1.

Comparative Example 2-2

A lithium secondary battery was produced and subjected to the above-described evaluations in the same manner as in Comparative Example 2-1, except that 0.5% by mass of lithium difluorophosphate was used in the electrolyte solution of Comparative Example 2-1.

TABLE 2

|  | additives | initial discharge resistance (%) | battery swelling (%) |
|---|---|---|---|
| Example 2-1 | compound (1-4) 0.5% by mass | 94.0 | 97.5 |
| Example 2-2 | compound (1-4) 0.5% by mass + $LiPO_2F_2$ 0.5% by mass | 87.1 | 97.5 |
| Comparative Example 2-1 | none | 100.0 | 100.0 |
| Comparative Example 2-2 | $LiPO_2F_2$ 0.5% by mass | 90.4 | 119.1 |

From Table 2, it is seen that the use of the electrolyte solution of Example 2-1 or 2-2 can inhibit battery swelling without causing an increase in the initial discharge resistance as compared to those cases without an addition of the compound represented by Formula (1) (Comparative Examples 2-1 and 2-2). Further, the use of the electrolyte solution of Comparative Example 2-2 resulted in an increase in battery swelling; however, in Example 2-2 where a combination of lithium difluorophosphate and the compound 1-4 was used, an increase in battery swelling was not observed as compared to Example 2-1 and Comparative Example 2-1. In other words, it was found that a synergistic effect of inhibiting battery swelling is exerted by using the compound represented by Formula (1) in combination with lithium difluorophosphate. Therefore, it is apparent that a lithium secondary battery using the nonaqueous electrolyte solution according to the present invention has superior properties.

Example 3-1 and Comparative Examples 3-1 and 3-2

Example 3-1

The initial discharge resistance and the amount of battery swelling were determined by conducting the same tests, except that 0.5% by mass of the compound (1-4) was used in place of 1.0% by mass of the compound (1-4) in the electrolyte solution of Example 1-6 and that, with regard to the high-temperature storage period in the high-temperature storage test using the thus produced lithium secondary battery, the lithium secondary battery was stored "at 85° C. for 1 day" instead of being stored twice "at 60° C. for 14 days".

Comparative Example 3-1

The initial discharge resistance and the amount of battery swelling were determined by conducting the same tests, except that, with regard to the high-temperature storage period in the high-temperature storage test using the lithium secondary battery produced in Comparative Example 1-1, the lithium secondary battery was stored "at 85° C. for 1 day" instead of being stored twice "at 60° C. for 14 days".

Comparative Example 3-2

A lithium secondary battery was produced and subjected to the above-described evaluations in the same manner as in Example 3-1, except that 0.5% by mass of the compound (2-5) was used in place of 0.5% by mass of the compound (1-4) in the electrolyte solution of Example 3-1.

TABLE 3

| | additives | initial discharge resistance (%) | battery swelling (%) |
|---|---|---|---|
| Example 3-1 | compound (1-4) 0.5% by mass | 92.0 | 76.0 |
| Comparative Example 3-1 | none | 100.0 | 100.0 |
| Comparative Example 3-2 | compound (2-5) 0.5% by mass | 108.0 | 92.0 |

From Table 3, it is seen that the use of the electrolyte solution of Example 3-1 can inhibit battery swelling without causing an increase in the initial discharge resistance as compared to those cases where the electrolyte solution does not contain the compound represented by Formula (1) (Comparative Examples 3-1 and 3-2). Therefore, it is apparent that a lithium secondary battery using the nonaqueous electrolyte solution according to the present invention has superior properties.

This application is based on Japanese patent application filed on Jul. 31, 2019 (Japanese Patent Application No. 2019-141464), the entirety of which is hereby incorporated by reference.

INDUSTRIAL APPLICABILITY

According to the nonaqueous electrolyte solution of the present invention, an energy device containing the nonaqueous electrolyte solution can be provided with a reduced initial discharge resistance and inhibited gas generation during storage; therefore, the electrolyte solution can be suitably utilized in a wide variety of fields where an energy device is used, such as electronics.

Further, the nonaqueous electrolyte solution and an energy device using the same can be used in a variety of known applications where an energy device is used. Specific examples of such applications include laptop computers, stylus computers, portable computers, electronic book players, mobile phones, portable fax machines, portable copiers, portable printers, portable audio players, small camcorders, headphone stereos, video cameras, liquid crystal TVs, handy cleaners, portable CD players, mini-disc players, transceivers, electronic organizers, calculators, memory cards, portable tape recorders, radios, back-up power supplies, motors, automobiles, motorcycles, motor-assisted bikes, bicycles, lighting equipment, toys, gaming machines, watches, power tools, strobe lights, cameras, household backup power sources, backup power sources for commercial use, load leveling power sources, power sources for storing natural energy, and lithium ion capacitors.

While the invention has been described in detail and with reference to specific embodiments thereof, it will be apparent to one skilled in the art that various changes and modifications can be made therein without departing from the spirit and scope thereof.

The invention claimed is:

1. A nonaqueous electrolyte solution comprising a compound represented by the following Formula (1) together with an electrolyte and a nonaqueous solvent:

wherein, X represents an optionally substituted unsaturated hydrocarbon group having 2 to 5 carbon atoms and at least one unsaturated carbon-carbon bond;

Y represents an organic group having 1 to 10 carbon atoms, which consists of atoms selected from the group consisting of a carbon atom, a hydrogen atom, an oxygen atom, a sulfur atom, and a phosphorus atom;

$R^1$ represents a hydrogen atom, a halogen atom, or an unsubstituted or halogen atom-substituted hydrocarbon group having 1 to 10 carbon atoms;

$R^2$ represents an unsubstituted or halogen atom-substituted hydrocarbon group having 1 to 10 carbon atoms;

n represents an integer of 1 to 3;

if the compound includes plural $R^1$, each $R^1$ is the same or different from the other;

if the compound includes plural $R^2$, each $R^2$ is the same or different from the other; and if the compound includes plural Ys each Y is the same or different from the other, with a proviso that $R^2$ and one selected from X and Y are not bound with each other to form a ring.

2. The nonaqueous electrolyte solution according to claim 1, wherein X comprises a group having at least one carbon-carbon double bond.

3. The nonaqueous electrolyte solution according to claim 1, wherein X is an aliphatic unsaturated hydrocarbon group having at least one carbon-carbon double bond.

4. The nonaqueous electrolyte solution according to claim 1, wherein $R^1$ is an alkyl group having 1 to 10 carbon atoms.

5. The nonaqueous electrolyte solution according to claim 1, wherein $R^2$ is an alkylene group having 1 to 10 carbon atoms.

6. The nonaqueous electrolyte solution according to claim 1, wherein Y is a hydrocarbon group or an alkylsulfonyl group having 1 to 10 carbon atoms, or an alkyloxycarbonyl group or an alkylcarbonyl group having 2 to 10 carbon atoms.

7. The nonaqueous electrolyte solution according to claim 1, wherein the content of the compound represented by Formula (1) is 0.001% by mass to 10% by mass with respect to a total amount of the nonaqueous electrolyte solution.

8. The nonaqueous electrolyte solution according to claim 1, wherein Y comprises the oxygen atom.

9. The nonaqueous electrolyte solution according to claim 1, wherein Y comprises the sulfur atom.

10. The nonaqueous electrolyte solution according to claim 1, wherein Y comprises, and the phosphorus atom.

11. The nonaqueous electrolyte solution according to claim 6, wherein Y is the hydrocarbon group having 1 to 10 carbon atoms.

12. The nonaqueous electrolyte solution according to claim 6, wherein Y is the alkylsulfonyl group having 1 to 10 carbon atoms.

13. The nonaqueous electrolyte solution according to claim 6, wherein Y is the alkyloxycarbonyl group having 2 to 10 carbon atoms.

14. The nonaqueous electrolyte solution according to claim 6, wherein Y is the alkylcarbonyl group having 2 to 10 carbon atoms.

15. The nonaqueous electrolyte solution according to claim 1, wherein the content of the compound represented by Formula (1) is 0.001% by mass to 7% by mass with respect to a total amount of the nonaqueous electrolyte solution.

16. The nonaqueous electrolyte solution according to claim 1, wherein the content of the compound represented by Formula (1) is 0.001% by mass to 5% by mass with respect to a total amount of the nonaqueous electrolyte solution.

17. The nonaqueous electrolyte solution according to claim 1, wherein Y represents the organic group having 1 to 10 carbon atoms, which consists of atoms selected from the group consisting of a carbon atom, a hydrogen atom, an oxygen atom, and a phosphorus atom.

18. The nonaqueous electrolyte solution according to claim 1, wherein the compound represented by Formula (1) comprises at least one selected from the group consisting of compounds below:

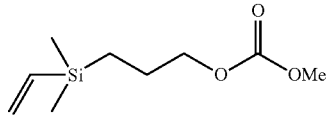
(1-1)

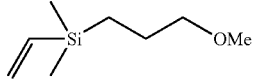
(1-2)

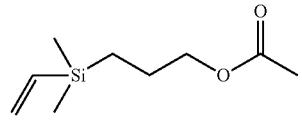
(1-3)

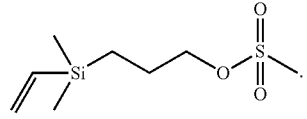
(1-4)

19. An energy device, comprising:
a negative electrode;
a positive electrode; and
the nonaqueous electrolyte solution according to claim 1.

20. The energy device according to claim 19, wherein
the positive electrode comprises a positive electrode active material, and
the positive electrode active material comprises a lithium-transition metal composite oxide represented by the following composition formula (3):

$$Li_{a101}Ni_{b101}Co_{c101}M_{d101}O_2 \qquad (3)$$

wherein, a101, b101, c101, and d101 represent numerical values satisfying $0.90 \leq a101 \leq 1.10$, $0.40 \leq b101 \leq 0.98$, $0.01 \leq c101 < 0.50$ and $0.01 \leq d101 < 0.50$, respectively, and satisfy $b101+c101+d101=1$; and M represents at least one element selected from the group consisting of Mn, Al, Mg, Zr, Fe, Ti, and Er.

* * * * *